(12) United States Patent
Tsukahara et al.

(10) Patent No.: US 10,691,250 B2
(45) Date of Patent: Jun. 23, 2020

(54) INFORMATION PROCESSING DEVICE, INFORMATION PROCESSING METHOD, AND PROGRAM FOR PREVENTING REFLECTION OF AN OPERATION IN AN OUTPUT

(71) Applicant: SONY CORPORATION, Tokyo (JP)

(72) Inventors: Tsubasa Tsukahara, Tokyo (JP); Jun Kimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 130 days.

(21) Appl. No.: 15/752,757

(22) PCT Filed: Sep. 9, 2016

(86) PCT No.: PCT/JP2016/076558
§ 371 (c)(1),
(2) Date: Feb. 14, 2018

(87) PCT Pub. No.: WO2017/051720
PCT Pub. Date: Mar. 30, 2017

(65) Prior Publication Data
US 2018/0239487 A1    Aug. 23, 2018

(30) Foreign Application Priority Data
Sep. 24, 2015    (JP) ................ 2015-187341

(51) Int. Cl.
*G06F 3/0346* (2013.01)
*G06F 3/0354* (2013.01)
*G06F 3/041* (2006.01)
*G02B 27/01* (2006.01)
*H04N 5/64* (2006.01)

(52) U.S. Cl.
CPC ....... *G06F 3/0416* (2013.01); *G02B 27/0172* (2013.01); *G06F 3/0346* (2013.01); *G06F 3/03547* (2013.01); *G02B 2027/014* (2013.01); *G02B 2027/0138* (2013.01); *G02B 2027/0178* (2013.01); *G02B 2027/0181* (2013.01); *G02B 2027/0187* (2013.01); *H04N 5/64* (2013.01)

(58) Field of Classification Search
CPC .. G06F 3/0346; G06F 3/03547; G06F 3/0416; G02B 2027/0187; G02B 2027/0138; G02B 2027/0181; G02B 2027/0178; G02B 2027/014
See application file for complete search history.

(56) References Cited

U.S. PATENT DOCUMENTS

| 2011/0012814 A1* | 1/2011 | Tanaka | G02B 27/0176 345/8 |
| 2015/0067516 A1* | 3/2015 | Park | G06F 3/0304 715/728 |

(Continued)

*Primary Examiner* — Ryan A Lubit
(74) *Attorney, Agent, or Firm* — Paratus Law Group, PLLC

(57) ABSTRACT

There is provided an information processing device, an information processing method, and a program that enable improvement in the operability of an HMD. An output control unit prevents reflection of an operation in an output, in accordance with the attachment state of a housing to be attached to a head of a user. The operation is performed on an operation receiving unit provided in the housing. The present technology can be applied to a display module that forms an HMD.

14 Claims, 22 Drawing Sheets

(56) References Cited

U.S. PATENT DOCUMENTS

| | | | |
|---|---|---|---|
| 2015/0130711 A1* | 5/2015 | Lee | G02B 27/017 345/156 |
| 2015/0199064 A1* | 7/2015 | Cho | G02B 27/017 345/173 |
| 2017/0229095 A1* | 8/2017 | Raffle | G09G 5/006 |

* cited by examiner

FIG. 9
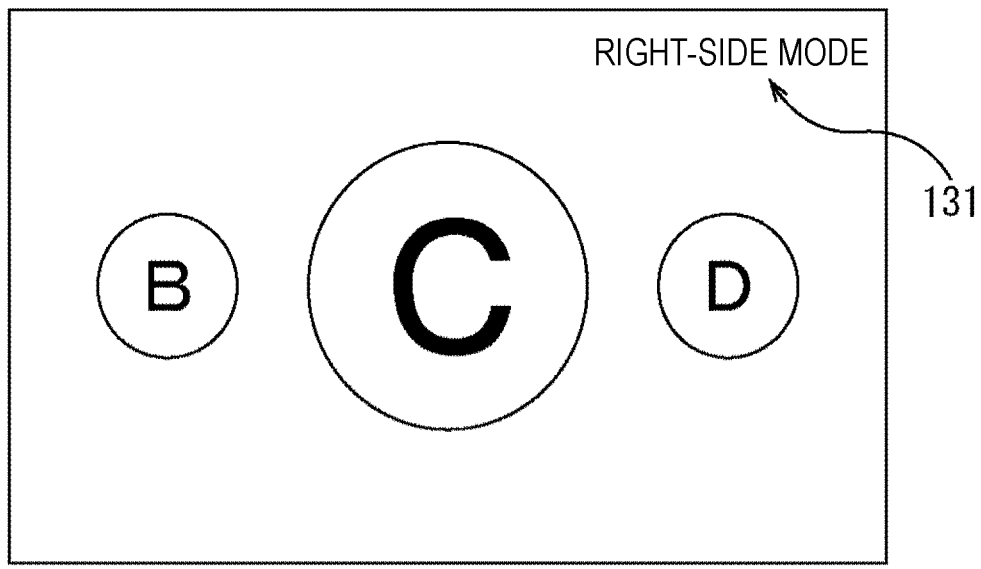
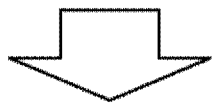
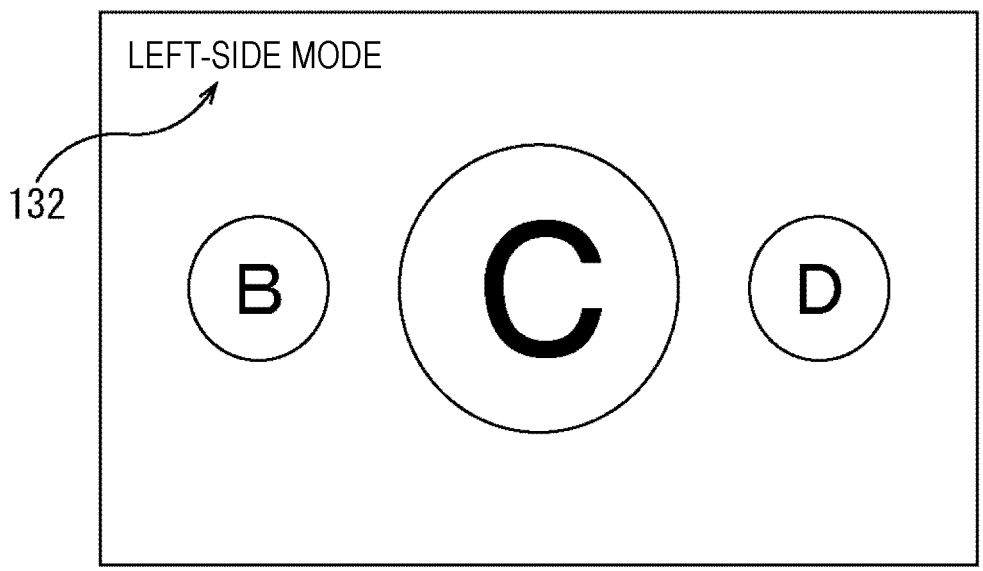

*FIG. 10*
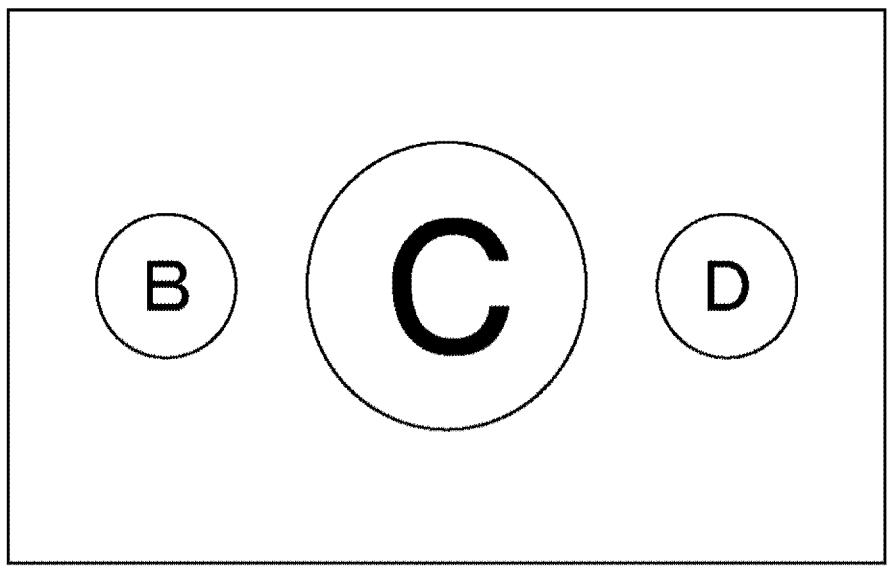
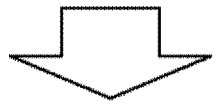
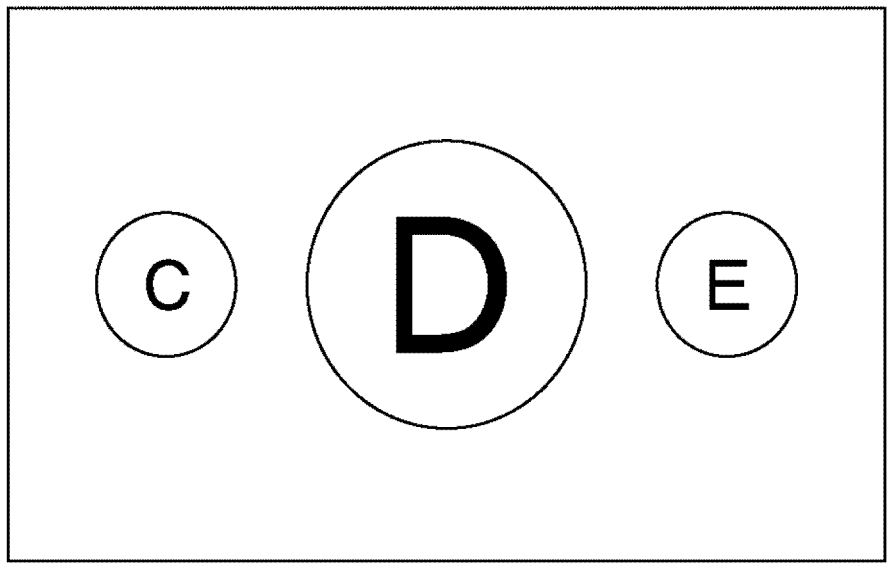

FIG. 11
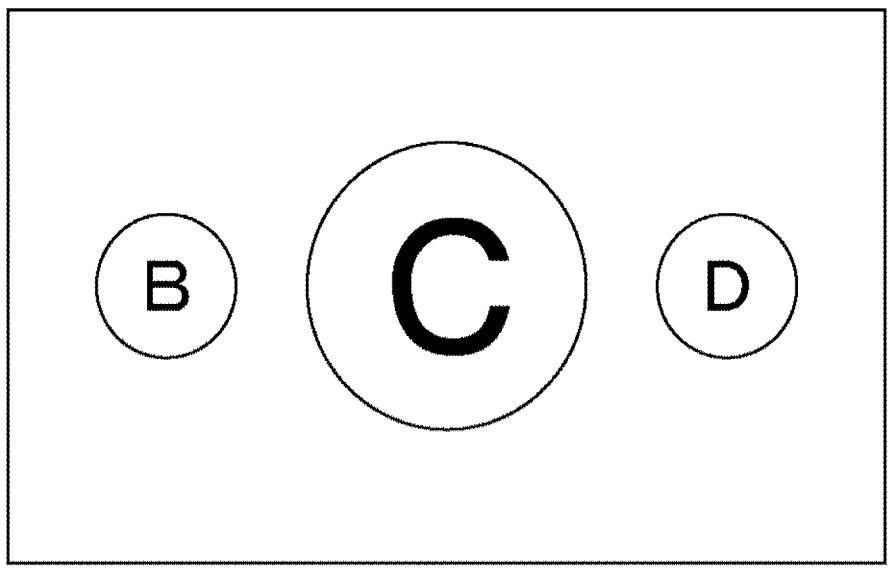
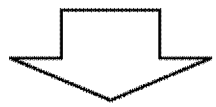
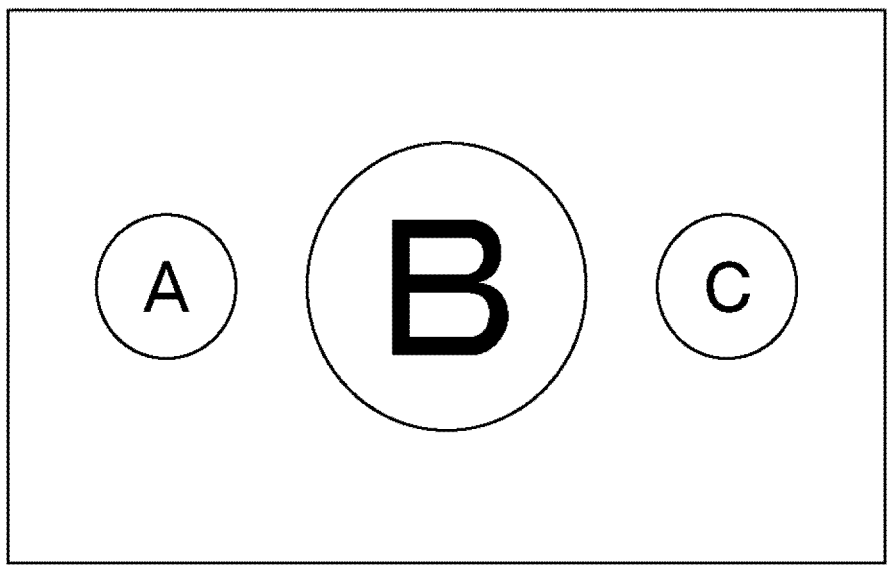

FIG. 17
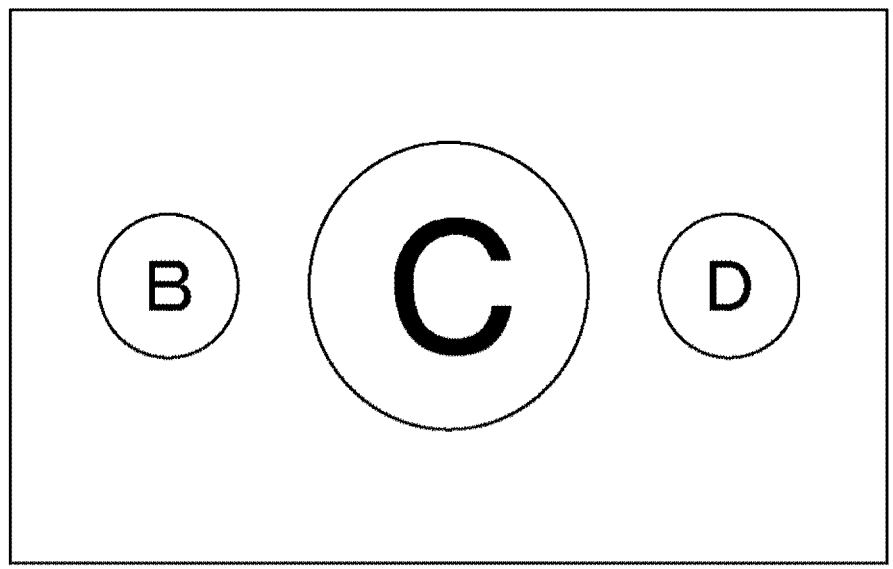
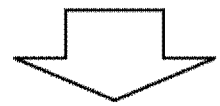
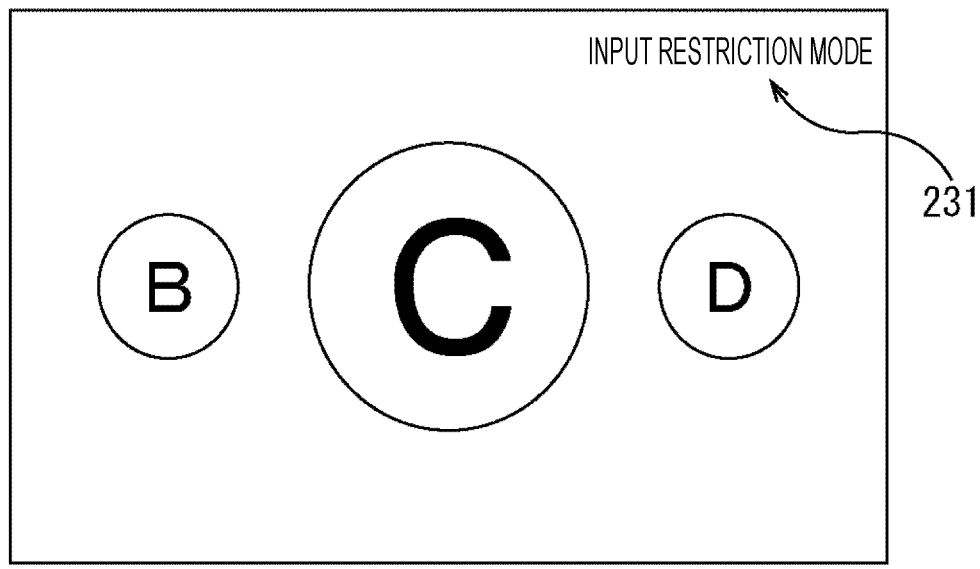

FIG. 18
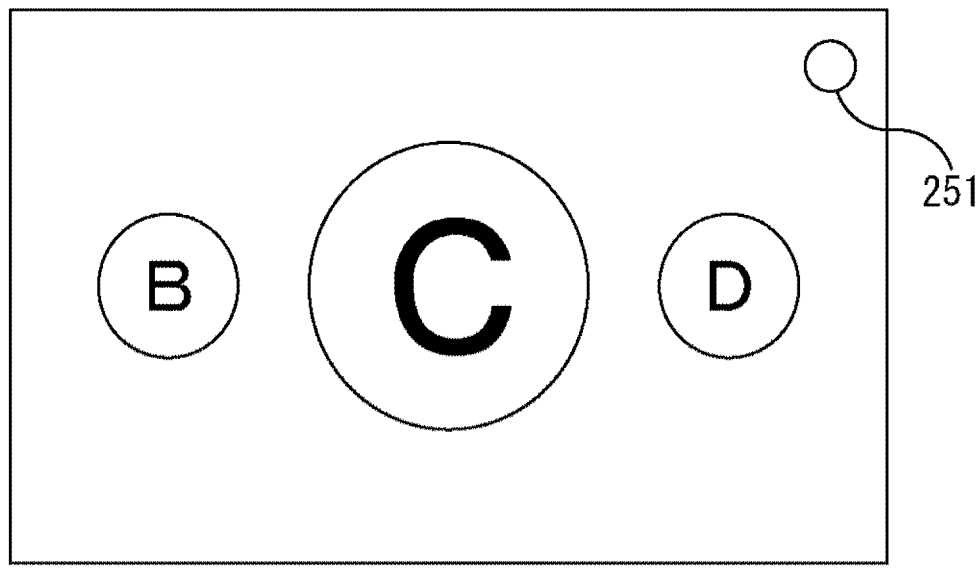
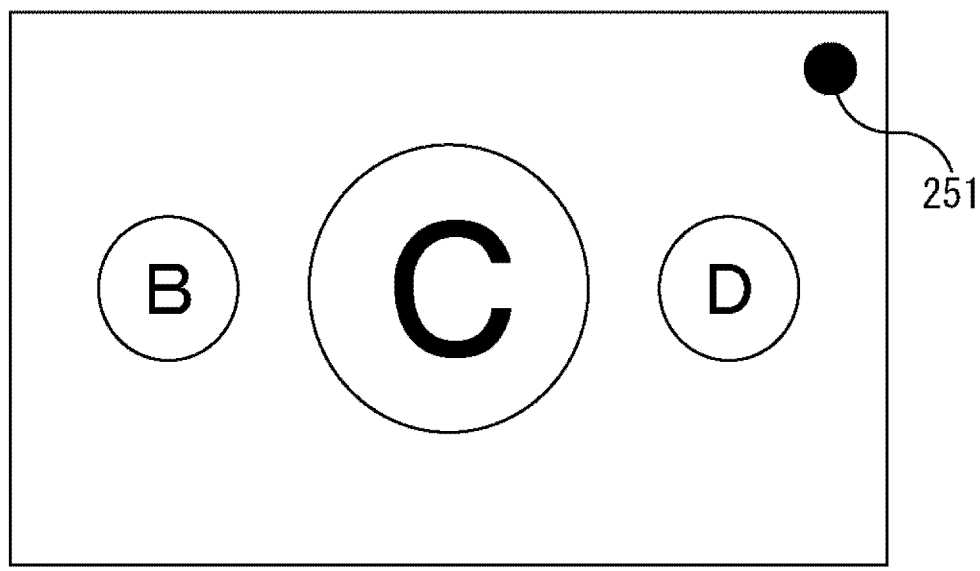

INFORMATION PROCESSING DEVICE, INFORMATION PROCESSING METHOD, AND PROGRAM FOR PREVENTING REFLECTION OF AN OPERATION IN AN OUTPUT

CROSS REFERENCE TO PRIOR APPLICATION

This application is a National Stage Patent Application of PCT International Patent Application No. PCT/JP2016/076558 (filed on Sep. 9, 2016) under 35 U.S.C. § 371, which claims priority to Japanese Patent Application No. 2015-187341 (filed on Sep. 24, 2015), which are all hereby incorporated by reference in their entirety.

TECHNICAL FIELD

The present technology relates to an information processing device, an information processing method, and a program, and more particularly, to an information processing device, an information processing method, and a program that enable improvement in the operability of an HMD.

BACKGROUND ART

In recent years, a technology related to an information processing device to be attached to a person's head has been developed. Such an information processing device is called a head-mounted display (HMD). An HMD has a function of providing an image to the user wearing the HMD.

Some HMDs are of a type having a display device attached to a temple portion of a spectacle frame. For example, Patent Document 1 discloses a configuration in which a display device is detachably attached to either of the right and left temple portions of a spectacle frame.

CITATION LIST

Patent Document

Patent Document 1: Japanese Patent Application Laid-Open No. 2014-137522

SUMMARY OF THE INVENTION

Problems to be Solved by the Invention

However, the patent document 1 does not mention the difference in an operation to be performed on the display device between a case where the display device is attached to the left side and a case where the display device is attached to the right side.

The present technology has been developed in view of those circumstances, and is to enable further improvement in the operability of an HMD.

Solutions to Problems

An information processing device of one aspect of the present technology includes an output control unit that prevents reflection of an operation in an output in accordance with an attachment state of a housing to be attached to a head of a user, the operation being performed on an operation receiving unit provided in the housing.

An information processing method of one aspect of the present technology includes a step of preventing reflection of an operation in an output in accordance with an attachment state of a housing to be attached to a head of a user, the operation being performed on an operation receiving unit provided in the housing.

A program of one aspect of the present technology causes a computer to perform a step of preventing reflection of an operation in an output in accordance with an attachment state of a housing to be attached to a head of a user, the operation being performed on an operation receiving unit provided in the housing.

According to one aspect of the present technology, reflection of an operation in an output is prevented in accordance with the attachment state of a housing to be attached to the a of a user, the operation being performed on an operation receiving unit provided in the housing.

Effects of the Invention

According to one aspect of the present technology, the operability of an HMD can be further improved.

BRIEF DESCRIPTION OF DRAWINGS

FIG. 9 is a diagram showing an example of an image displayed on an optical unit.

FIG. 10 is a diagram showing an example of an image displayed on the optical unit.

FIG. 11 is a diagram showing an example of an image displayed on the optical unit.

FIG. 17 is a diagram showing an example of an image displayed on an optical unit.

FIG. 18 is a diagram showing an example of an image displayed on the optical unit.

MODES FOR CARRYING OUT THE INVENTION

The following is a description of embodiments of the present technology, with reference to the drawings. Meanwhile, explanation will be made in the following order.

1. Overview of a display module
2. First embodiment (an example in which outputs of a touch sensor are controlled in accordance with attachment positions)
3. Second embodiment (an example in which outputs of a touch sensor are controlled in accordance with motional states)
4. Other aspects

1. Overview of a Display Module

Figure 1:
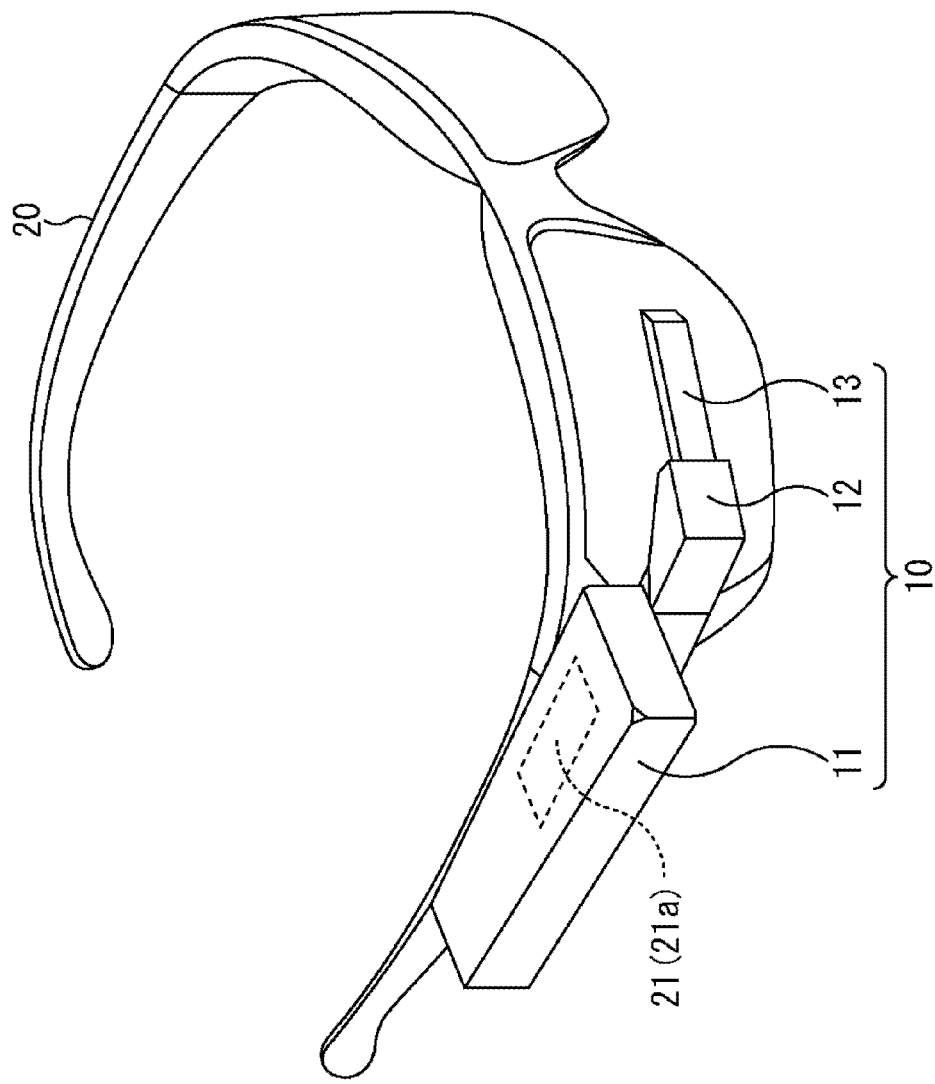
FIG. 1 is an external view of an example configuration of a display module according to this embodiment.

FIG. 1 shows an example configuration of a display module according to this embodiment.

As shown in FIG. 1, a display module 10 and a spectacle frame 20 constitute a head-mounted display (HMD). The display module 10 as an information processing device is attached to the right-side (right-eye side) temple portion of a pair of temple portions of the spectacle frame 20 mounted on a user's head.

The display module 10 is formed with a control unit 11, a display unit 12, and an optical unit 13.

The control unit 11 is connected to the display unit 12 and the spectacle frame 20. Specifically, an end portion in the longitudinal direction of the housing of the control unit 11 is joined to the display unit 12, and a side surface of the housing of the control unit 11 is connected to the temple portion of the spectacle frame 20 via a connecting member.

The control unit 11 contains a control board for controlling operation of the display module 10. Specifically, the control unit 11 contains a control board that includes a central processing unit (CPU), a random access memory (RAM), or the like.

A touch surface 21a of a touch sensor 21 is provided on the upper surface of the housing of the control unit 11. Further, as will be described later, a touch surface 21b (not shown) of the touch sensor 21 is provided on the lower surface of the housing of the control unit 11. The touch surfaces 21a and 21b receive user operations.

When a user is wearing the display module 10 (or the spectacle frame 20), the user is not able to visually recognize the touch surfaces 21a and 21b provided on the housing of the control unit 11. Therefore, the touch surfaces 21a and 21b are designed to form recessed portions in the surface of the housing of the control unit 11 on which the touch surfaces 21a and 21b are formed, so that the user can recognize the positions of the touch surfaces 21a and 21b by touching the surface of the housing of the control unit 11. It should be noted that the touch surfaces 21a and 21b may include a different material from the surface of the housing of the control unit 11 in which the touch surfaces 21a and 21b are provided.

The control unit 11 is connected to the optical unit 13 via the display unit 12.

The display unit 12 connects the control unit 11 and the optical unit 13, and supports the optical unit 13. Specifically, the display unit 12 is joined to both an end portion of the control unit 11 and an end portion of the optical unit 13, to secure the optical unit 13. The display unit 12 contains a signal line for communicating data related to an image to be provided from the control unit 11 to the optical unit 13, and a display for projecting the image onto the optical unit 13.

The optical unit 13 emits image light to the outside of the display module 10. Specifically, the optical unit 13 emits image light provided from the control unit 11 via the display unit 12 to the outside of the display module 10 through an ocular lens, or, toward an eye of the user wearing the display module 10.

(Configuration of the Optical Unit)

Figure 2:
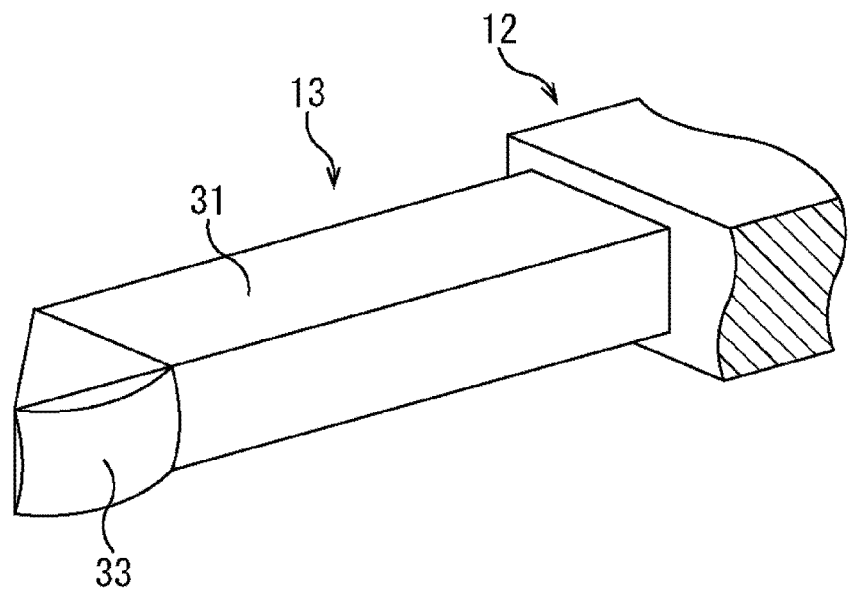
FIG. 2 is a perspective view of an example configuration of an optical unit.
Figure 3:
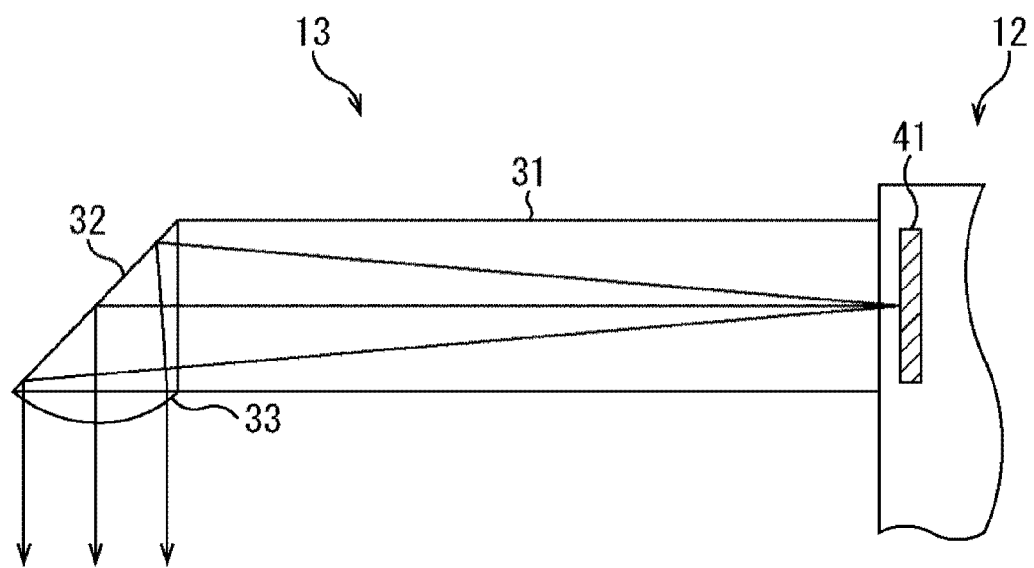
FIG. 3 is a cross-sectional view of the example configuration of the optical unit.
Figure 4:
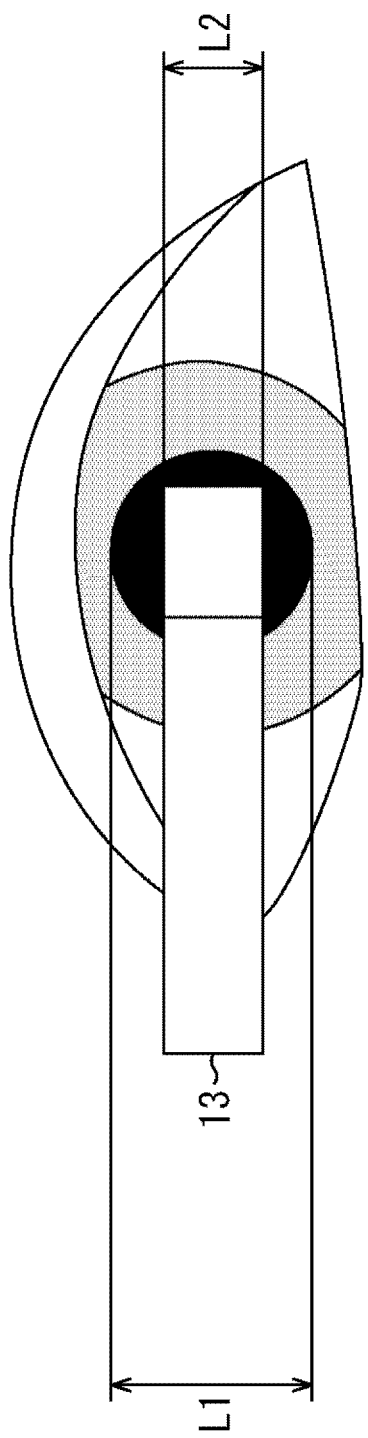
FIG. 4 is a diagram showing an example situation where a user is wearing the display module.

Referring now to FIGS. 2 through 4, the configuration of the optical unit 13 is described in detail.

FIG. 2 is a perspective view of an example configuration of the optical unit 13. FIG. 3 is a cross-sectional view of the example configuration of the optical unit 13. Further, FIG. 4 is a diagram showing an example situation where a user is wearing the display module 10.

As shown in FIGS. 2 and 3, the optical unit 13 is formed with a light guiding portion 31, a reflecting portion 32, and an ocular lens 33.

Image light from a projecting portion 41 provided in the display unit 12 is emitted to the light guiding portion 31. The projecting portion 41 is a display panel that displays an image provided from the control unit 11, and emits image light toward the light guiding portion 31 by displaying the image. The projecting portion 41 is formed with an organic electroluminescence (EL) display, for example.

The light guiding portion 31 guides the incident image light to the reflecting portion 32. The light guiding portion 31 is a columnar member as shown in FIG. 2, for example. As shown in FIG. 3, the light guiding portion 31 guides the image light so that the image light emitted from the projecting portion 41 reaches the reflecting portion 32 without leaking to the outside of the display module 10. It should be noted that the light guiding portion 31 may be a cylindrical member having a hollow inside, or may be a transparent member that transmits image light.

The reflecting portion 32 reflects the image light that has reached the reflecting portion 32, toward the ocular lens 33. For example, the reflecting portion 32 reflects the image light guided by the light guiding portion 31 toward the location of the ocular lens 34, as shown in FIG. 3.

The ocular lens 33 enlarges the image. Specifically, the ocular lens 33 refracts the image light reflected by the reflecting portion 32, and enlarges the image corresponding to the image light.

Further, the optical unit 13 is designed so that the length in the direction in which the length is shorter than in the other direction of the region where the light is emitted toward the pupil of the user is equal to or smaller than the variation upper limit of the pupil diameter. Specifically, the optical unit 13 is formed so that the width of the optical unit 13 in the lateral direction becomes equal to or smaller than the average pupil diameter.

As shown in FIG. 4, the optical unit 13 is designed so that the width L2 in the lateral direction of the optical unit 13 becomes equal to or smaller than the average pupil diameter L1, for example. Further, since the pupil diameter L1 of a person generally varies in the range of about 2 to 8 mm, L2 is set at a length of 8 mm or shorter, such as, 4 mm. Further, in the optical unit 13, the region from which light is emitted does not necessarily have a rectangular shape, and may have a circular shape, an elliptical shape, or some other polygonal shape.

(Configuration of the Control Unit)

Figure 5:
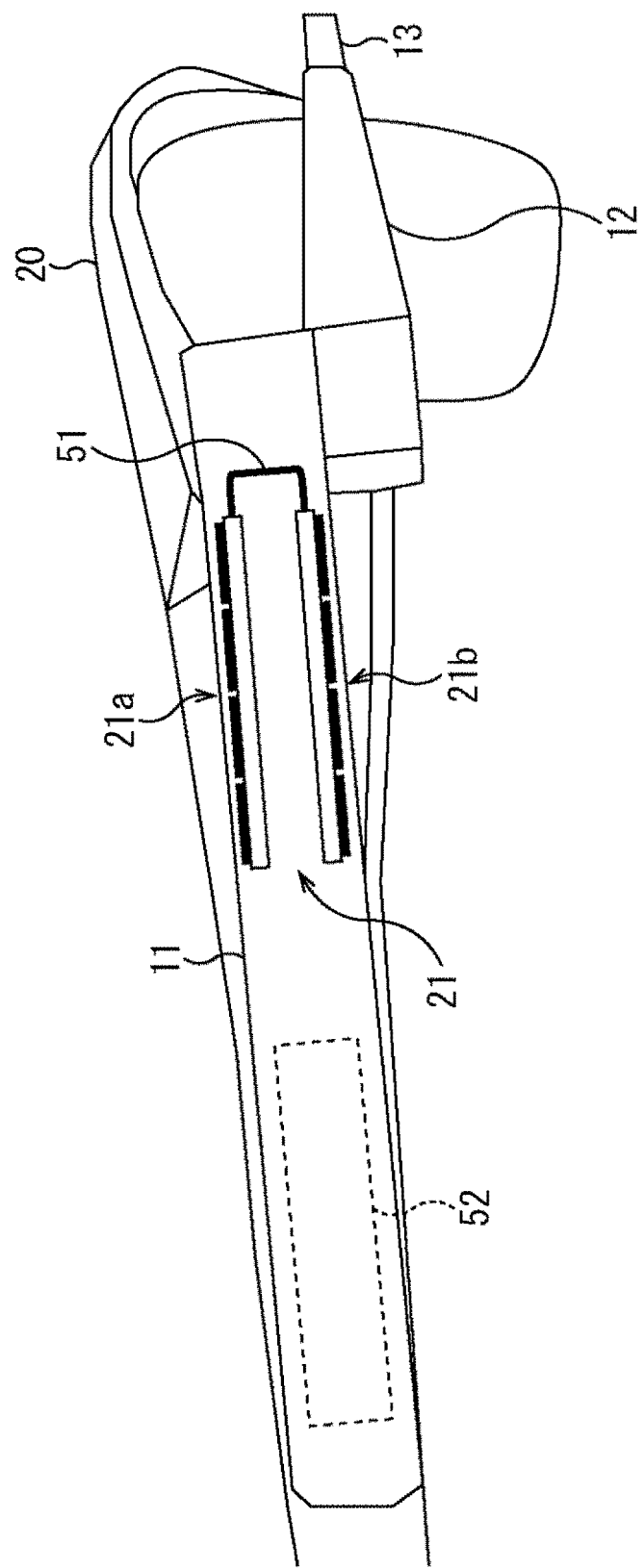
FIG. 5 is a diagram showing an example internal configuration of a control unit.

Referring now to FIG. 5, the configuration of the control unit 11 is described in detail.

FIG. 5 is a cross-sectional view of an example internal configuration of the control unit 11.

As shown in FIG. 5, the touch sensor 21 is provided on the front side of the control unit 11 (or on the lens-portion side of the spectacle frame 20). The touch surface 21a of the touch sensor 21 is formed in the first surface (the upper surface in FIG. 5) of the housing of the control unit 11, and the touch surface 21b is formed in a second surface (the lower surface in FIG. 5) on the opposite side of the housing of the control unit 11 from the first surface.

The touch sensor 21 is a capacitive touch sensor that detects electrostatic capacitance generated between an electrode and the current object. The touch surfaces 21a and 21b are formed by arranging a plurality of touch electrodes on each of two substrates provided on the upper surface side and the lower surface side of the housing of the control unit 11. The two substrates forming the touch surfaces 21a and 21b are electrically connected to each other by a flexible flat cable (FFC) 51. With such a configuration, a plurality of touch surfaces can be controlled by one sensor chip, and the costs of the sensor chip can be lowered.

It should be noted that a sensor chip may be provided for each substrate forming one touch surface.

Further, as the peripheries of the touch electrodes need to be connected to GND, the region (space) interposed between the touch surfaces 21a and 21b is shielded. Therefore, as shown in FIG. 5, a wireless antenna 52 is provided on the rear side of the control unit 11 (the side opposite from the lens portions of the spectacle frame 20).

The wireless antenna 52 performs wireless communication with an external device (such as a portable terminal owned by the user), using Wi-Fi (registered trademark) or Bluetooth (registered trademark), for example.

It should be noted that the display module 10 including the control unit 11 can be connected to one of the temple portions of the spectacle frame 20.

That is, in the example shown in FIG. 1, the display module 10 is attached to the right-side (right-eye side) one of the temple portions of the spectacle frame 20. Further, as shown in FIG. 6, the display module 10 may be attached to the left-side (left-eye side) one of the temple portions of the spectacle frame 20.

Figure 6:
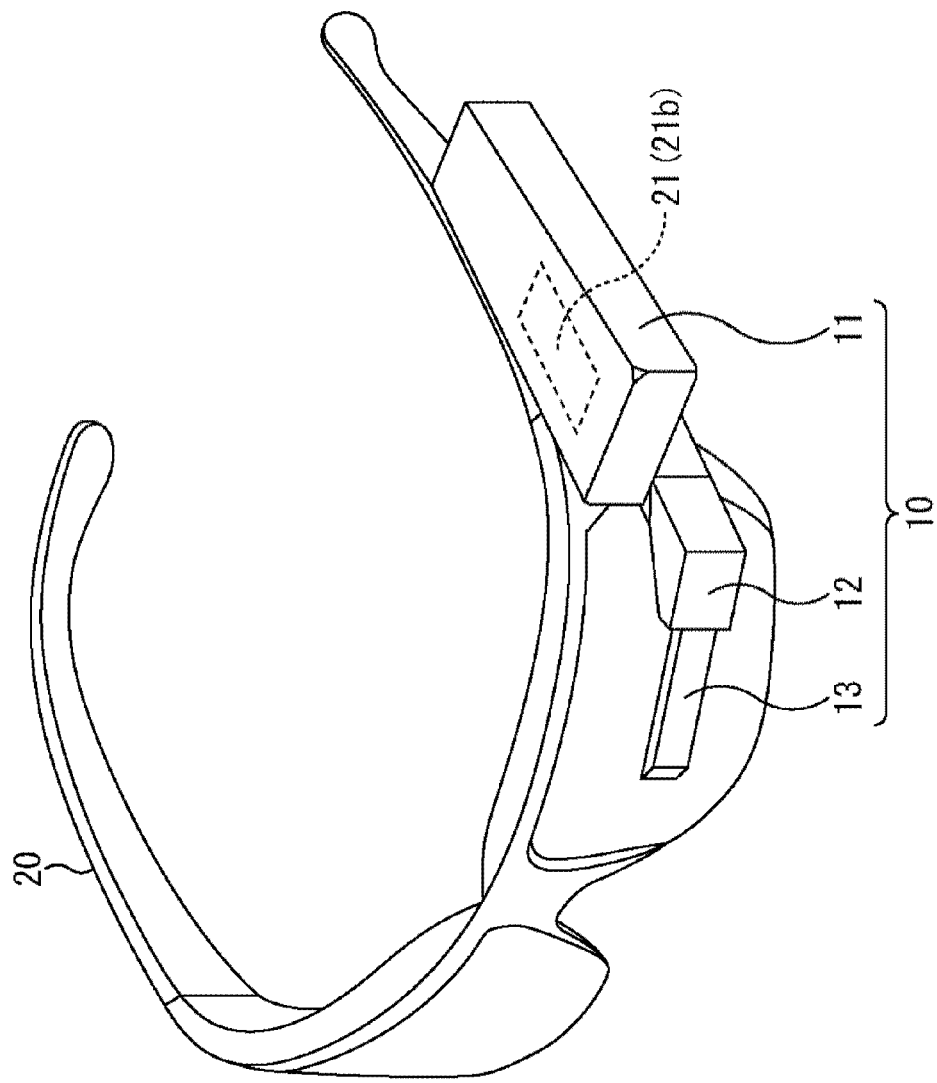
FIG. 6 is an external view of an example configuration of the display module.

In the example shown in FIG. 6, the touch surface 21b of the touch sensor 21 is formed in the upper surface of the housing of the control unit 11, and the touch surface 21a (not shown) of the touch sensor 21 is formed in the lower surface of the housing of the control unit 11.

As the touch surfaces of the touch sensor 21 are formed in the upper surface and the lower surface of the housing of the control unit 11, the user can operate the touch sensor 21 with still the same operability even in a case where the display module 10 is attached to either of the left and right temple portions of the spectacle frame 20.

2. First Embodiment (Example in which Outputs of a Touch Sensor are Controlled in Accordance with Attachment Positions)

In the description below, a display module 10 according to a first embodiment of the present technology is explained.

(Example Functional Configuration of a Display Module)

Figure 7:
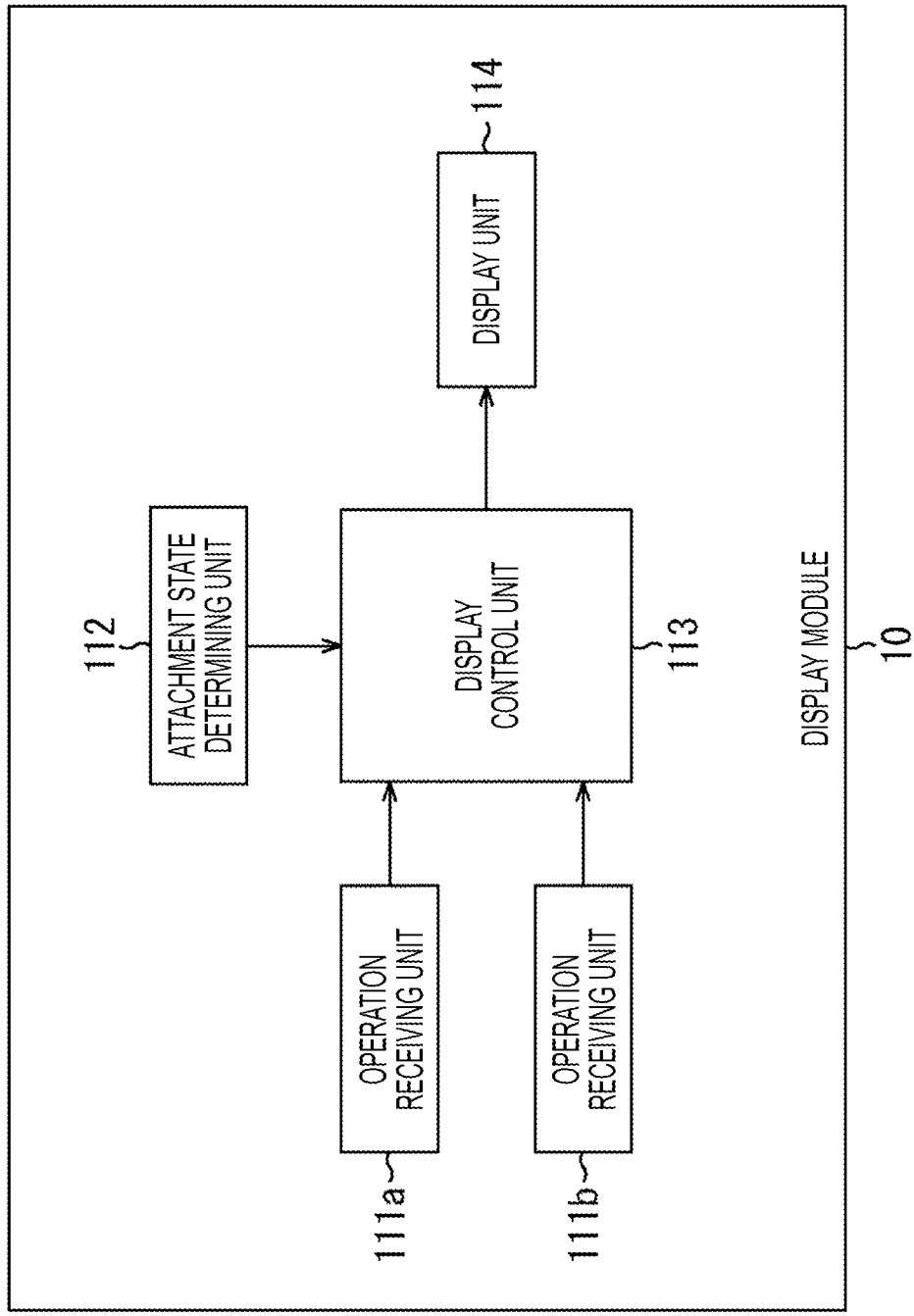
FIG. 7 is a block diagram showing an example functional configuration of a display module according to a first embodiment.

FIG. 7 shows an example functional configuration of a display module 10 according to the first embodiment of the present technology.

The display module 10 shown in FIG. 7 includes operation receiving units 111a and 111b, an attachment state determining unit 112, a display control unit 113, and a display unit 114.

The operation receiving units 111a and 111b are equivalent to the touch surfaces 21a and 21b of the touch sensor 21. The operation receiving units 111a and 111b receive a user operation such as tapping, long tapping, or swiping. The operation receiving units 111a and 111b supply a signal corresponding to the received user operation to the display control unit 113.

The attachment state determining unit 112 determines the attachment state of the housing of the control unit 11. Specifically, the attachment state determining unit 112 determines to which one of the pair of temple portions of the spectacle frame 20 the control unit 11 (or the housing thereof) is connected. The attachment state determining unit 112 supplies a signal indicating the determination result to the display control unit 113.

For example, the attachment state determining unit 112 is designed to include an acceleration sensor, and determines the posture of the housing from an output of the acceleration sensor. By doing so, the attachment state determining unit 112 determines to which one of the temple portions the housing is connected. Alternatively, the attachment state determining unit 112 may be designed to include a gyro sensor, and determines the posture of the housing from an output of the gyro sensor. By doing so, the attachment state determining unit 112 may determine to which one of the temple portions the housing is connected.

Further, the attachment state determining unit 112 may perform proximity wireless communication such as Near Field Communication (NFC) with the spectacle frame 20, to determine which one of the temple portions the housing is connected. Alternatively, the attachment state determining unit 112 may determine to which one of the temple portions the housing is connected, in accordance with the positional relationship between the control unit 11 and the optical unit 13.

Still further, the attachment state determining unit 112 may determine to which one of the temple portions the housing is connected, in accordance with information that is set beforehand by the user. For example, in a setting mode in which various settings are performed on the display module 10, the attachment state determining unit 112 may make the user to select to which temple portion the housing is to be connected, and then determine to which one of the temple portions the housing is connected in accordance with the result of the user's selection.

The display control unit 113 is designed as an output control unit that controls an output corresponding to an operation performed on the operation receiving units 111a and 111b, in accordance with the determined attachment state of the control unit 11 (or the housing thereof). Specifically, the display control unit 113 controls display of an image on the display unit 114, in accordance with signals from the operation receiving units 111a and 111b and the attachment state determining unit 112.

The display unit 114 is equivalent to the display unit 12 and the optical unit 13. As shown in FIGS. 1 and 6, the display unit 114 may be provided in the vicinity of a lens portion of the spectacle frame 20 or may be provided in a lens portion of the spectacle frame 20.

(Display Process of the Display Module)

Figure 8:
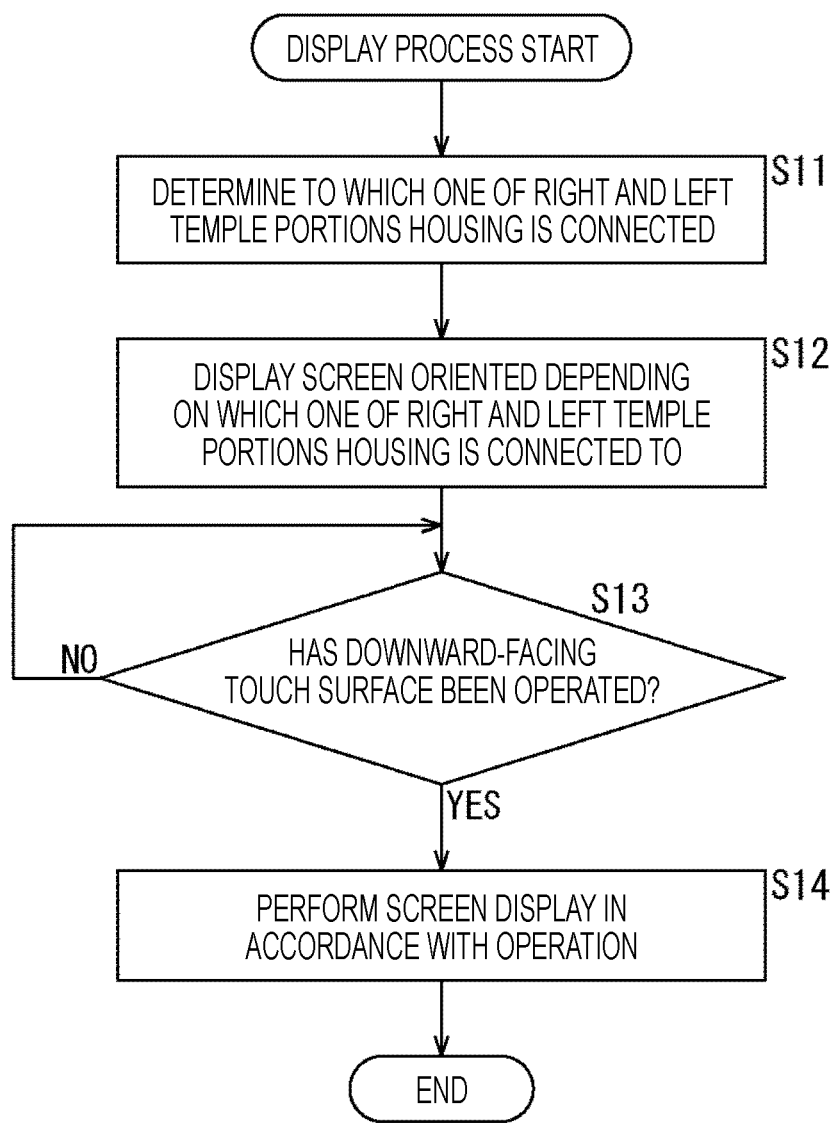
FIG. 8 is a flowchart for explaining a display process.

Referring now to the flowchart in FIG. 8, a display process of the display module 10 is described. The process shown in FIG. 8 is started when the display module 10 (or the housing of the control unit 11) is connected to one of the temple portions of the spectacle frame 20, for example.

In step S11, the attachment state determining unit 112 determines to which one of the right and left temple portions the housing of the control unit 11 is connected. The attachment state determining unit 112 supplies a signal indicating the determination result to the display control unit 113.

In step S12, the display control unit 113 displays, on the display unit 114, a screen oriented depending on which one of the right and left temple portions the housing is connected to, in accordance with the signal from the attachment state determining unit 112. In a case where the housing of the control unit 11 is connected to the right-side temple portion (FIG. 1), image light emitted from the optical unit 13 is vertically the inversion of the image light emitted in a case where the housing of the control unit 11 is connected to the left-side temple portion (FIG. 6). Therefore, the display control unit 113 switches the vertical orientation of the image to be displayed on the display unit 114, depending on which one of the right and left temple portions the housing is connected to. Further, in this case, the output of the acceleration sensor or the gyro sensor forming the attachment state determining unit 112 is also regarded as inverted, depending on which one of the right and left temple portions the housing is connected to. Specifically, the output of the acceleration sensor or the gyro sensor may be inverted, or the display control unit 113 may recognize that the output of the acceleration sensor or the gyro sensor is inverted.

At this stage, the display control unit 113 may display, on the display unit 114, information indicating to which one of the right and left temple portions the housing of the control unit 11 is connected.

For example, in a case where the housing of the control unit 11 is connected to the right-side temple portion, the words "right-side mode" 131 indicating that the housing is connected to the right-side temple portion are displayed in the upper right corner of the screen displayed on the display unit 114, as shown in the upper half of FIG. 9.

Also, if the housing of the control unit 11 is connected to the left-side temple portion in the situation shown in the upper half of FIG. 9, the words "left-side mode" 132 indicating that the housing is connected to the left-side temple portion are displayed in the upper left corner of the screen displayed on the display unit 114, as shown in the lower half of FIG. 9.

It should be noted that the screen shown in FIG. 9 is an example of a menu screen of a display-related application that is provided by the display module 10. In the example shown in FIG. 9, icons representing menu B, menu C, and menu D are displayed. Of these icons, the icon representing the menu C is displayed at the center of the menu screen, and is in a larger size than the other icons in a selectable state. The icons displayed on the menu screen are scrolled horizontally (transversely) on the screen by a user operation performed on the touch sensor 21.

Referring back to the flowchart in FIG. 8, the display control unit 113 determines whether the downward-facing one of the touch surfaces 21a and 21b of the touch sensor 21 has been operated. Specifically, in a case where the housing of the control unit 11 is connected to the right-side temple portion (FIG. 1), a check is made to determine whether the touch surface 21b has been operated. In a case where the housing of the control unit 11 is connected to the left-side temple portion (FIG. 6), on the other hand, a check is made to determine whether the touch surface 21a has been operated.

If it is determined in step S13 that the downward-facing touch surface has been operated, the process moves on to step S14.

In step S14, the display control unit 113 performs screen display on the display unit 114, in accordance with the user operation performed on the downward-facing touch surface.

For example, in a case where swiping from rear to front is performed on the downward-facing touch surface in a situation where the menu screen shown in the upper half of FIG. 10 is displayed on the display unit 114, the menu screen is scrolled to the left. As a result, the icon representing the menu C that was displayed on the right side of the menu screen is now displayed in a large size at the center of the menu screen, as shown in the lower half of FIG. 10.

Also, in a case where swiping from front to rear is performed on the downward-facing touch surface in a situation where the menu screen shown in the upper half of FIG. 11 is displayed on the display unit 114, the menu screen is scrolled to the left. As a result, the icon representing the menu B that was displayed on the left side of the menu screen is now displayed in a large size at the center of the menu screen, as shown in the lower half of FIG. 11.

In a case where it is determined in step S13 that the downward-facing touch surface has not been operated, on the other hand, the display control unit 113 does nothing until the downward-facing touch surface is operated. Therefore, even if the upward-facing touch surface is operated, the menu screen shown in the upper half of FIG. 10 or FIG. 11 is not scrolled.

That is, the display control unit 113 prevents outputs from reflecting any operation on the upward-facing touch surface. Specifically, the display control unit 113 invalidates operations performed on the upward-facing touch surface. In other words, even if the upward-facing touch surface has been operated, the display control unit 113 does not determine that an operation has been performed, or does not perform any display control after determining that an operation has been performed. Consequently, any user operation performed on the upward-facing touch surface is not reflected by the screen displayed on the display unit 114. Further, the display control unit 113 may turn off the power supply to the electrode corresponding to the upward-facing touch surface of the touch surfaces of the touch sensor 111, so that any user operation performed on the upward-facing touch surface will not be reflected by the screen displayed on the display unit 114.

In the above process, even in a case where the display module is connected to either one of the right and left temple portions of the spectacle frame, screen display is performed in accordance with an operation performed on the downward-facing touch surface of the two touch surfaces. In other words, even in a case where the display module is connected to either one of the right and left temple portions of the spectacle frame, the user can obtain the same screen display by the same operation in either case. As a result, the operability of the HMD can be further improved.

In the above described examples, the display control unit 113 invalidates an operation performed on the operation receiving unit 111a or 111b so that the user operation will not be reflected by the screen displayed on the display unit 114. The present invention is not limited to this, and user operations may not be prevented from being reflected by the screen displayed on the display unit 114, but may be made difficult to be reflected by the screen.

For example, the display control unit 113 reduces the gain of an output amount relative to an operation input amount of the operation receiving unit 111a or 111b, in accordance with the attachment state of the housing of the control unit 11.

Alternatively, the display control unit 113 may set stricter conditions for detection of an operation performed on the operation receiving unit 111a or 111b, in accordance with the attachment state of the housing of the control unit 11. For example, the value of the electrostatic capacitance serving as the reference for detection of a user operation (such as tapping or swiping) performed on the upward-facing touch surface is made higher, in accordance with the attachment state of the housing of the control unit 11.

Further, the display control unit 113 may narrow the detectable range for operations performed on the operation receiving unit 111a or 111b, in accordance with the attachment state of the housing of the control unit 11.

Also, the display control unit 113 may lower the sensitivity for detection of an operation performed on the operation receiving unit 111a or 111b, in accordance with the attachment state of the housing of the control unit 11.

Although the operation receiving units 111a and 111b are equivalent to the touch surfaces 21a and 21b of the touch sensor 21 in the above example, they may be equivalent to some other components. For example, the operation receiving units 111a and 111b may be physical input devices such as buttons or dials. Alternatively, the operation receiving units 111a and 111b may be sensors that detect gestures and lines of sight of users by sensing visible light, infrared rays, radio waves, sound waves, and the like.

(Modification)

It should be noted that operations that can be received as operations on the downward-facing touch surface may include not only swiping to the front or the rear, but also swiping in transverse directions, such as planar operations on the touch surface. Further, a direction in which a finger separates from the touch surface may be detected so that a three-dimensional operation on the touch surface can be received.

Also, in the above embodiment, the two touch surfaces are formed in the upper surface and the lower surface of the housing of the control unit 11. However, one touch surface may be formed in only one surface of the housing of the control unit 11. In this case, the housing of the control unit 11 has such a configuration that the front sides and the rear sides of the display unit 12 and the optical unit 13 are switched when being attached to the right- or left side temple portion, so that the surface provided with the touch surface always faces downward, for example.

It should be noted that, in such a configuration, the direction of finger movement relative to the touch surface and the direction of finger movement sensed by the touch surface in a case where the housing of the control unit 11 is connected to the left-side temple portion are the opposite of those in a case where the housing of the control unit 11 is connected to the right-side temple portion.

Therefore, in such a configuration, the display control unit 111 performs switching so that the output (image display) corresponding to an operation performed on the touch surface is inverted, in accordance with the attachment state of the housing of the control unit 11. For example, the display control unit 111 inverts display control on a signal supplied from the touch surface, depending on whether the housing of the control unit 11 is connected to the right-side temple portion and whether the housing is connected to the left-side temple portion.

For example, in a situation where the housing of the control unit 11 is connected to the right-side temple portion and the menu screen shown in the upper half of FIG. 10 is displayed on the display unit 114, swiping in the direction from the right toward the left is performed on the touch surface. At this point of time, the direction of the finger movement detected by the touch surface is the direction from the side further from the portion connected to the temple portion toward the side closer to portion connected to the temple portion. In this case, the menu screen scrolls to the left. As a result, the icon representing the menu C that was displayed on the right side of the menu screen is now displayed in a large size at the center of the menu screen, as shown in the lower half of FIG. 10.

On the other hand, in a situation where the housing of the control unit 11 is connected to the left-side temple portion and the menu screen shown in the upper half of FIG. 10 is displayed on the display unit 114, swiping in the same direction as the above described direction from the right toward the left is performed on the touch surface. At this point of time, the direction of the finger movement detected by the touch surface is the opposite of the direction in the above described example, and is the direction from the side closer to the portion connected to the temple portion toward the side further from the portion connected to the temple portion. In this case, the menu screen also scrolls to the left side. As a result, the icon representing the menu C that was displayed on the right side of the menu screen is now displayed in a large size at the center of the menu screen, as shown in the lower half of FIG. 10.

It should be noted that, in the above example, the display control unit 111 may invert the screen display by inverting the signal supplied from the touch surface, depending on whether the housing of the control unit 11 is connected to the right-side temple portion and whether the housing is connected to the left-side temple portion.

Further, in the above described example, only operations performed on the downward-facing touch surface of the two touch surfaces formed in the upper surface and the lower surface of the housing of the control unit 11 are accepted. However, only operations performed on the upward-facing touch surface may be accepted, or operations performed on both touch surfaces may be accepted. In a case where operations performed both touch surfaces are accepted, a predetermined command may be started when tapping or swiping is performed simultaneously on both touch surfaces, for example.

(Another Example Configuration of the Display Module)

Figure 12:
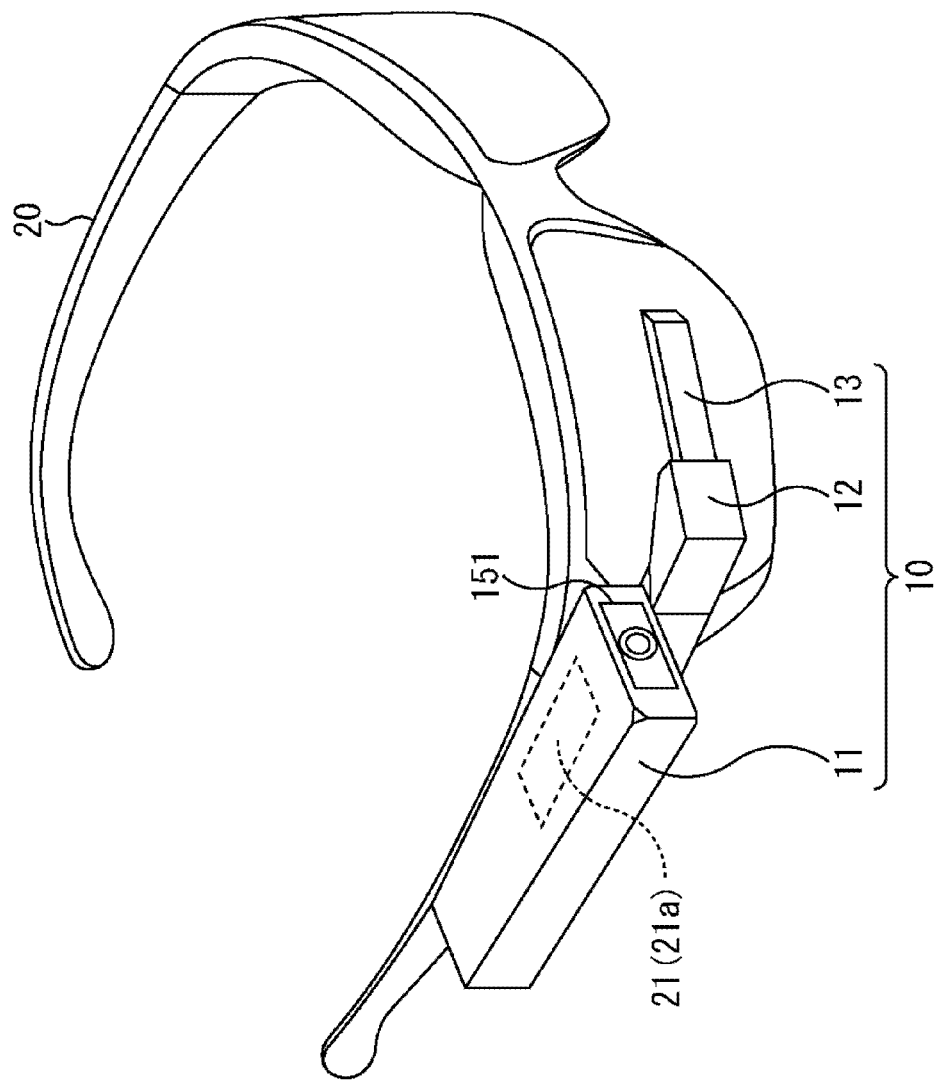
FIG. 12 is an external view showing another example configuration of a display module.

FIG. 12 is an external view of another example configuration of the display module according to the first embodiment.

The display module 10 shown in FIG. 12 includes a camera 151, as well as the components of the display module 10 shown in FIG. 1.

The camera 151 is provided on the surface of the housing of the control unit 11 on the viewing direction side of the spectacle frame 20 in such a manner as to expose the lens. The camera 151 performs imaging in the viewing direction of the spectacle frame 20.

(Example Functional Configuration of the Display Module)

Figure 13:
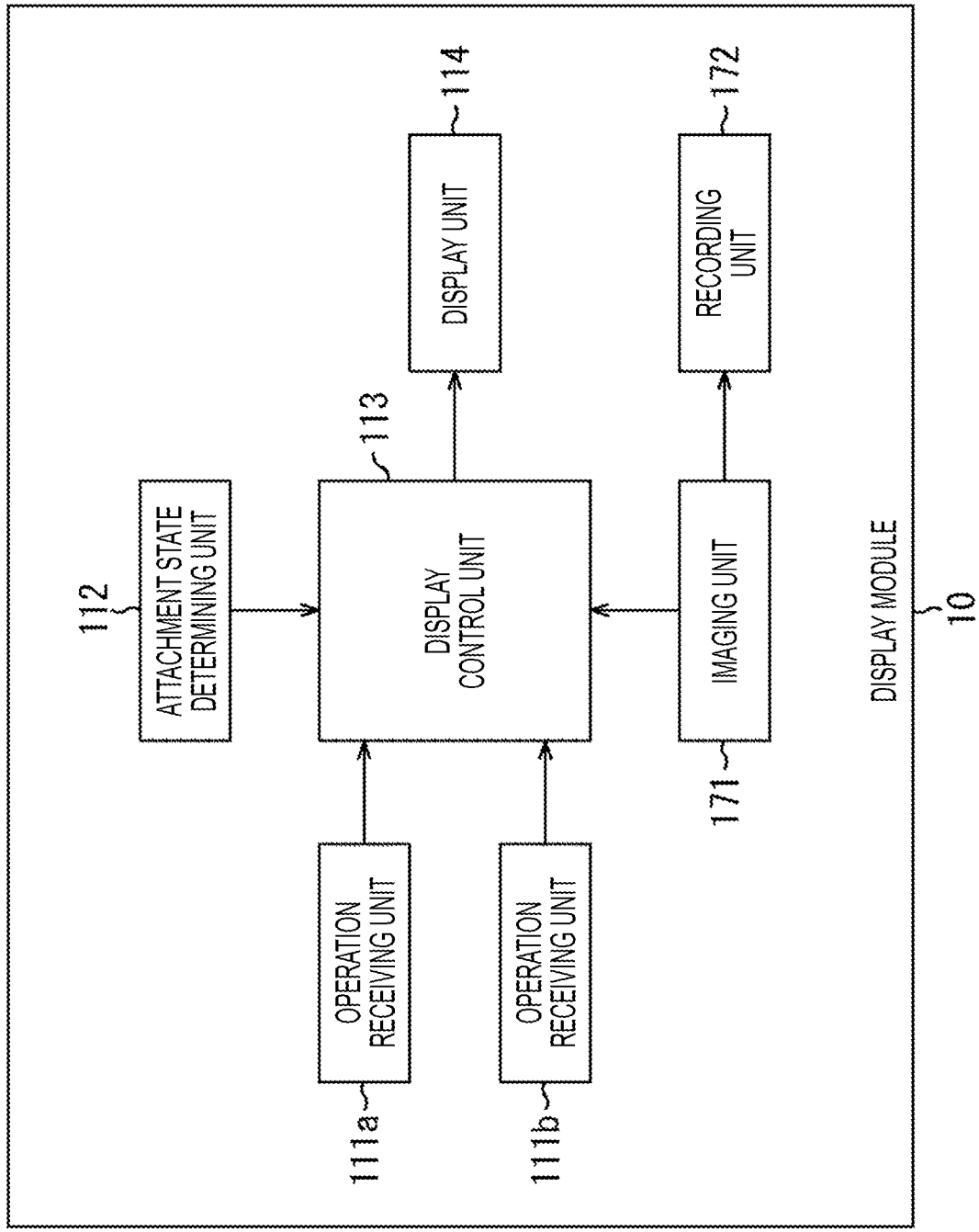
FIG. 13 is a block diagram showing another example functional configuration of the control unit.

FIG. 13 shows an example functional configuration of the display module 10 shown in FIG. 12.

The display module 10 shown in FIG. 13 further includes an imaging unit 171 and a recording unit 172, as well as the components of the display module 10 shown in FIG. 7.

The imaging unit 171 is equivalent to the camera 151. The imaging unit 171 supplies the data of a captured image to the display control unit 113. The display control unit 113 displays an image on the display unit 114, in accordance with the data from the imaging unit 171.

The imaging unit 171 also supplies the data of the captured image to the recording unit 172. That is, the recording unit 172 records the image captured by the imaging unit 171.

(Imaging Process of the Display Module)

Figure 14:
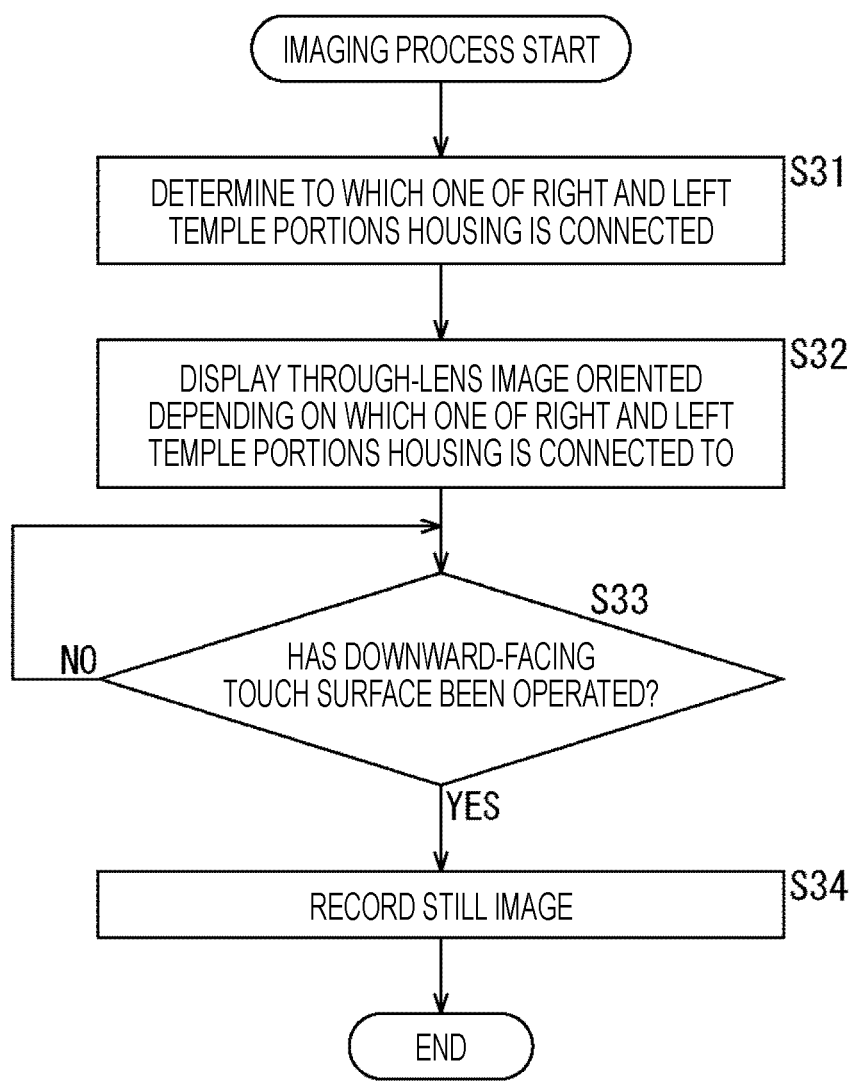
FIG. 14 is a flowchart for explaining an imaging process.

Referring now to the flowchart in FIG. 14, the imaging process of the display module 10 shown in FIG. 13 is described. The process shown in FIG. 14 is started when the display module 10 (or the housing of the control unit 11) is connected to one of the temple portions of the spectacle frame 20.

In step S31, the attachment state determining unit 112 determines to which one of the right and left temple portions the housing (the control unit 11) is connected. The attachment state determining unit 112 supplies a signal indicating the determination result to the display control unit 113.

In step S32, the display control unit 113 displays, on the display unit 114, a through-lens image, or a so-called live view, which is oriented depending on which one of the right and left temple portions the housing is connected to, in accordance with the signal from the attachment state determining unit 112. In a case where the housing of the control unit 11 is connected to the right-side temple portion, image light emitted from the optical unit 13 is vertically the inversion of the image light emitted in a case where the housing of the control unit 11 is connected to the left-side temple portion. Therefore, the display control unit 113 switches the vertical orientation of the through-lens image to be displayed on the display unit 114, depending on which one of the right and left temple portions the housing is connected to.

At this stage, the display control unit 113 may display, on the display unit 114, information indicating to which one of the right and left temple portions the housing of the control unit 11 is connected.

In step S33, the display control unit 113 determines whether the downward-facing one of the touch surfaces 21*a* and 21*b* of the touch sensor 21 has been tapped, for example. Specifically, in a case where the housing of the control unit 11 is connected to the right-side temple portion, a check is made to determine whether the touch surface 21*b* has been operated. In a case where the housing of the control unit 11 is connected to the left-side temple portion, on the other hand, a check is made to determine whether the touch surface 21*a* has been operated.

If it is determined in step S33 that the downward-facing touch surface has been operated, the process moves on to step S34.

In step S34, the imaging unit 171 causes the recording unit 172 to record the still image captured when the downward-facing touch surface was operated. This still image is also an image oriented depending on which one of the right and left temple portions the housing is connected to.

In a case where it is determined in step S33 that the downward-facing touch surface has not been operated, on the other hand, any still image is not recorded until the downward-facing touch surface is operated. Therefore, even if the upward-facing touch surface is operated, any still image is not recorded.

In the above process, even in a case where the display module is connected to either one of the right and left temple portions of the spectacle frame, a still image is recorded in accordance with an operation performed on the downward-facing touch surface of the two touch surfaces. In other words, even in a case where the display module is connected to either one of the right and left temple portions of the spectacle frame, the user can obtain a captured image by the same operation in either case. As a result, the operability of the HMD can be further improved.

3. Second Embodiment (Example in which Outputs of a Touch Sensor are Controlled in Accordance with Motional States)

In the description below, a display module 10 according to a second embodiment of the present technology is explained.

(Example Functional Configuration of the Display Module)

Figure 15:
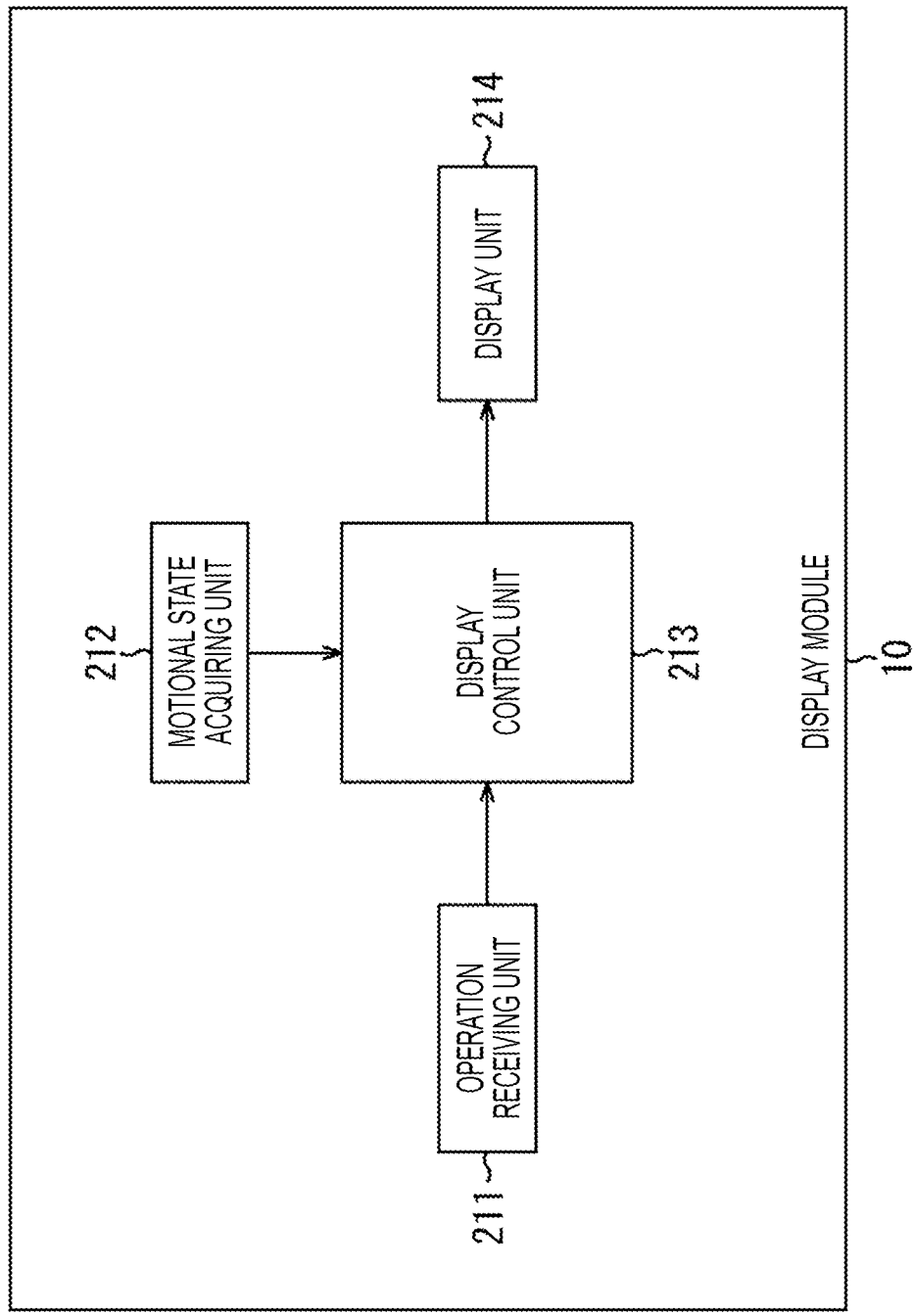
FIG. 15 is a block diagram showing an example functional configuration of a display module according to a second embodiment.

FIG. 15 shows an example functional configuration of a display module 10 according to the second embodiment of the present technology.

The display module 10 shown in FIG. 15 includes an operation receiving unit 211, a motional state acquiring unit 212, a display control unit 213, and a display unit 214.

The operation receiving unit 211 is equivalent to the touch surfaces 21*a* and 21*b* of the touch sensor 21. The operation receiving unit 211 receives a user operation such as tapping, long tapping, or swiping. The operation receiving unit 211 supplies a signal corresponding to the received user operation to the display control unit 213.

It should be noted that, in this example, it does not matter which one of the touch surfaces 21*a* and 21*b* equivalent to the operation receiving unit 211 is operated. That is, only the downward-facing touch surface may receive operations as in the first embodiment, or either of the touch surfaces may receive operations.

The motional state acquiring unit 212 acquires information about a motional state of the user wearing the display module 10. Specifically, the motional state acquiring unit 212 acquires a quantity of motion (an intensity of motion) of the user as information about a motional state. An intensity of motion is calculated by biometric sensing (sensing of biological information such as heart rate, perspiration, body temperature, blood pressure, myoelectric potential, electroencephalogram, or respiration). Alternatively, an intensity of motion may be calculated from the moving speed of the user, the result of recognition of a behavior such as being still, walking, or running. The motional state acquiring unit 212 supplies a signal indicating the information about the acquired motional state to the display control unit 113.

For example, the motional state acquiring unit 212 is designed to include an acceleration sensor, and acquires an output of the acceleration sensor as information about a motional state of the user. Alternatively, the motional state acquiring unit 212 may be designed to include a global positioning system (GPS) sensor, and acquire an output of the GPS sensor as information about a motional state of the user.

The display control unit 213 controls display of an image on the display unit 214.

The display control unit 213 is also designed as an output control unit that controls an output corresponding to an operation performed on the operation receiving unit 211, in accordance with acquired information about a motional state of the user. Specifically, the display control unit 213 controls an output corresponding to an operation for an image to be displayed on the display unit 214, in accordance with a signal from the motional state acquiring unit 212.

The display unit 214 is equivalent to the display unit 12 and the optical unit 13. As shown in FIGS. 1 and 6, the display unit 214 may be provided in the vicinity of a lens portion of the spectacle frame 20 or may be provided in a lens portion of the spectacle frame 20.

(Input/Output Control Process of the Display Module)

Figure 16:
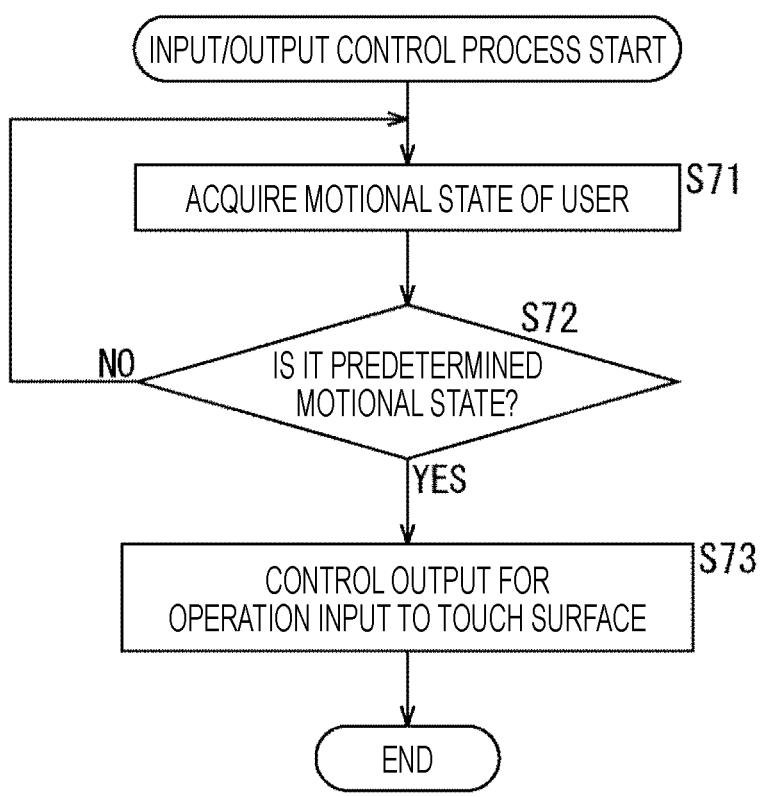
FIG. 16 is a flowchart for explaining an input/output control process.

Referring now to the flowchart in FIG. 16, a display process of the display module 10 is described. The process shown in FIG. 16 is started when the user is wearing the spectacle frame 20 to which the display module 10 is connected, and the display unit 214 is displaying a predetermined screen.

In step S71, the motional state acquiring unit 212 acquires information about a motional state of the user. The motional state acquiring unit 212 supplies a signal indicating the information about the motional state of the user to the display control unit 213.

In step S72, the display control unit 213 determines whether the motional state of the user is a predetermined motional state, in accordance with the signal from the motional state acquiring unit 212. Specifically, in accordance with the quantity of motion (or the intensity of motion) of the user, the display control unit 213 determines whether the quantity of motion is larger than a predetermined quantity (a predetermined level). For example, in a case where the moving speed of the user is higher than a predetermined speed, the display control unit 213 can determine that the quantity of motion of the user is larger than the predetermined quantity. Also, in a case where the user is running, the display control unit 213 can determine that the quantity of motion of the user is larger than the predetermined quantity. Further, in a case where the value indicated by biological information, such as the numerical value of the heart rate, is higher than a predetermined value, the display control unit 213 can determine that the quantity of motion of the user is larger than the predetermined quantity, in accordance with the biological information obtained by biometric sensing. Furthermore, the display control unit 213 can determine that the quantity of motion of the user is larger than the predetermined quantity, in a case where the vibration of the display module 10 (or the control unit 11) is calculated from an output of the acceleration sensor included in the motional state acquiring unit 212, and the vibration period is shorter than a predetermined time, or the amplitude of the vibration is higher than a predetermined amplitude.

If it is determined in step S72 that the quantity of motion of the user is the predetermined motional state, or the quantity of motion (the intensity of motion) of the user is larger than the predetermined quantity (the predetermined level), the process moves on to step S73.

In step S73, the display control unit 213 controls the output corresponding to an operation performed on the operation receiving unit 211 with respect to the screen displayed on the display unit 214. By doing so, the display control unit 213 prevents the operation on the operation receiving unit 211 from being reflected by the screen displayed on the display unit 214. Specifically, the operation performed on the operation receiving unit 211 is invalidated. In other words, even if the operation receiving unit 211 has been operated, the display control unit 213 does not determine that an operation has been performed, or does not perform any display control after determining that an operation has been performed. Consequently, any user operation is not reflected by the screen displayed on the display unit 214.

At this stage, the display control unit 213 may display information indicating a change in the motional state of the user on the screen displayed on the display unit 214.

For example, in a case where the intensity of motion of the user becomes higher than the predetermined level while the menu screen shown in the upper half of FIG. 17 is displayed, the words "input restriction mode" 231 indicating that user operations are restricted are displayed, as shown in the lower half of FIG. 17.

Alternatively, the color of an indicator 251 displayed in the upper right corner of the menu screen shown in FIG. 18 may change with the motional state of the user. Specifically, in a situation where the intensity of motion of the user is not higher than the predetermined level, the color of the indicator 251 is white or green, for example, as shown in the upper half of FIG. 18. Then, when the intensity of motion of the user becomes higher than the predetermined level, the color of the indicator 251 changes to black or red, for example, as shown in the lower half of FIG. 18.

Referring back to the flowchart in FIG. 16, if it is determined in step S72 that the motional state of the user is not the predetermined motional state, or the intensity of motion of the user is not higher than the predetermined level, the process returns to step S71, and the processing in steps S71 and S72 is repeated.

In the above process, in a case where the intensity of motion of the user is higher than the predetermined level, any operation performed on the touch surface of the touch sensor is invalidated. Therefore, even in a case where the user wearing the spectacle frame 20 to which the display module 10 is connected operates the touch sensor while moving, there is no fear that an erroneous operation will be performed, and it becomes possible to prevent any erroneous operation on the HMD.

In the above example, even if the operation receiving unit 211 has been operated, the display control unit 213 does not determine that an operation has been performed, or does not perform any display control after determining that an operation has been performed, so that any user operation will not be reflected by the screen displayed on the display unit 214. Other than that, the display control unit 213 may turn off the power supply to the operation receiving unit 211 so that any user operation will not be reflected by the screen displayed on the display unit 214.

Alternatively, user operations may not be prevented from being reflected by the screen displayed on the display unit 214, but may be made difficult to be reflected by the screen.

For example, the display control unit 213 reduces the gain of an output amount relative to an operation input amount of the operation receiving unit 211, in accordance with the motional state of the housing of the user. In a case where the intensity of motion of the user becomes higher than a predetermined level, for example, the amount of scrolling of the menu screen relative to the amount of movement of the finger in the swiping performed on the operation receiving unit 211 is reduced to a third of the normal amount (the amount in a case where the intensity of motion of the user is not higher than the predetermined level).

Further, the display control unit 213 may set stricter conditions for detection of an operation performed on the operation receiving unit 211, in accordance with the motional state of the user. For example, the value of the electrostatic capacitance serving as the reference for detection of a user operation (such as tapping or swiping) performed on the operation receiving unit 211 may be made higher, in accordance with the motional state of the user. As a result, in a case where the intensity of motion of the user becomes higher than the predetermined level, the detection sensitivity of the operation receiving unit 211 can be lowered.

Further, the display control unit 213 may narrow the detectable range for operations performed on the operation receiving unit 211, in accordance with the motional state of the user.

Also, the display control unit 213 may lower the sensitivity for detection of an operation performed on the operation receiving unit 211, in accordance with the motional state of the user.

Further, the display control unit 213 may cause an output to be generated in response to an operation performed after a predetermined operation on the operation receiving unit 211, in accordance with the motional state of the user. For example, in a case where the intensity of motion of the user becomes higher than a predetermined level, an output in response to normal tapping or swiping is generated after long tapping is performed on the operation receiving unit 211 for a longer time than a predetermined time. Because of this, the user stops moving before performing an operation on the operation receiving unit 211, and as a result, erroneous operations can be prevented.

Also, the display control unit 213 may invalidate a routine operation performed on the operation receiving unit 211, in accordance with the motional state of the user. For example, in a case where the intensity of motion of the user becomes higher than the predetermined level, any continuous touching operation performed on the operation receiving unit 211 is ignored. Because of this, even in a case where an ornament of the helmet worn by the user, the user's hair, or the like is always in contact with the touch surface of the touch sensor 21, it is possible to prevent any erroneous operation due to such contact.

In the above example, the output in response to an operation performed on the operation receiving unit 211 is controlled in accordance with the quantity of motion of the user. However, the output in response to an operation may be further controlled in accordance with the direction of motion of the user.

For example, in a case where the direction of motion of the user is a predetermined direction, and the quantity of motion of the user is larger than a predetermined amount, the output in response to an operation is controlled. An operation on the operation receiving unit 211 in a case where the user is running is more difficult than that in a case where the user is riding a bicycle, for example, because running involves a large quantity of vertical motion. Therefore, in a case where the quantity of vertical motion is larger than a predetermined quantity even though the quantity of motion is the same, reflection in the output in response to an operation is prevented. With this, a user who is running can be prevented from performing an erroneous operation.

Although the operation receiving unit 211 is equivalent to the touch surfaces 21a and 21b of the touch sensor 21 in the above example, the operation receiving unit 211 may be equivalent to some other component. For example, the operation receiving unit 211 may be a physical input device such as a button or a dial. Alternatively, the operation receiving unit 211 may be a sensor that detects gestures and lines of sight of users by sensing visible light, infrared rays, radio waves, sound waves, and the like.

4. Other Aspects

It should be noted that the configurations according to the first and second embodiments described above may be combined.

The above described first embodiment can also have the configurations described below.

Figure 19:
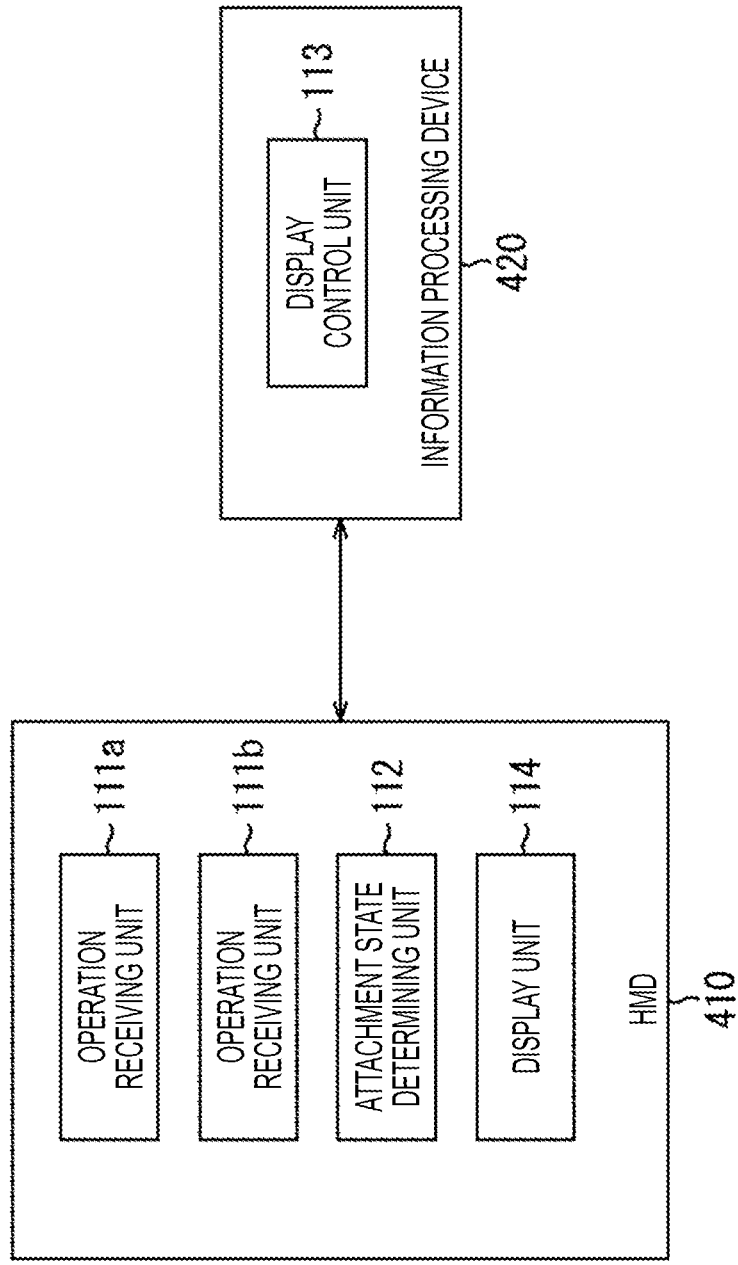
FIG. 19 is a block diagram showing another example functional configuration of the first embodiment.

As shown in FIG. 19, an HMD 410 that includes the operation receiving units 111a and 111b, the attachment state determining unit 112, and the display unit 114, and an information processing device 420 that includes the display control unit 113 may be formed as separate structures, and perform wired communication or wireless communication using Wi-Fi (registered trademark), Bluetooth (registered trademark), or the like with each other, for example. In this case, the information processing device 420 is designed as a portable terminal such as a smartphone.

Figure 20:
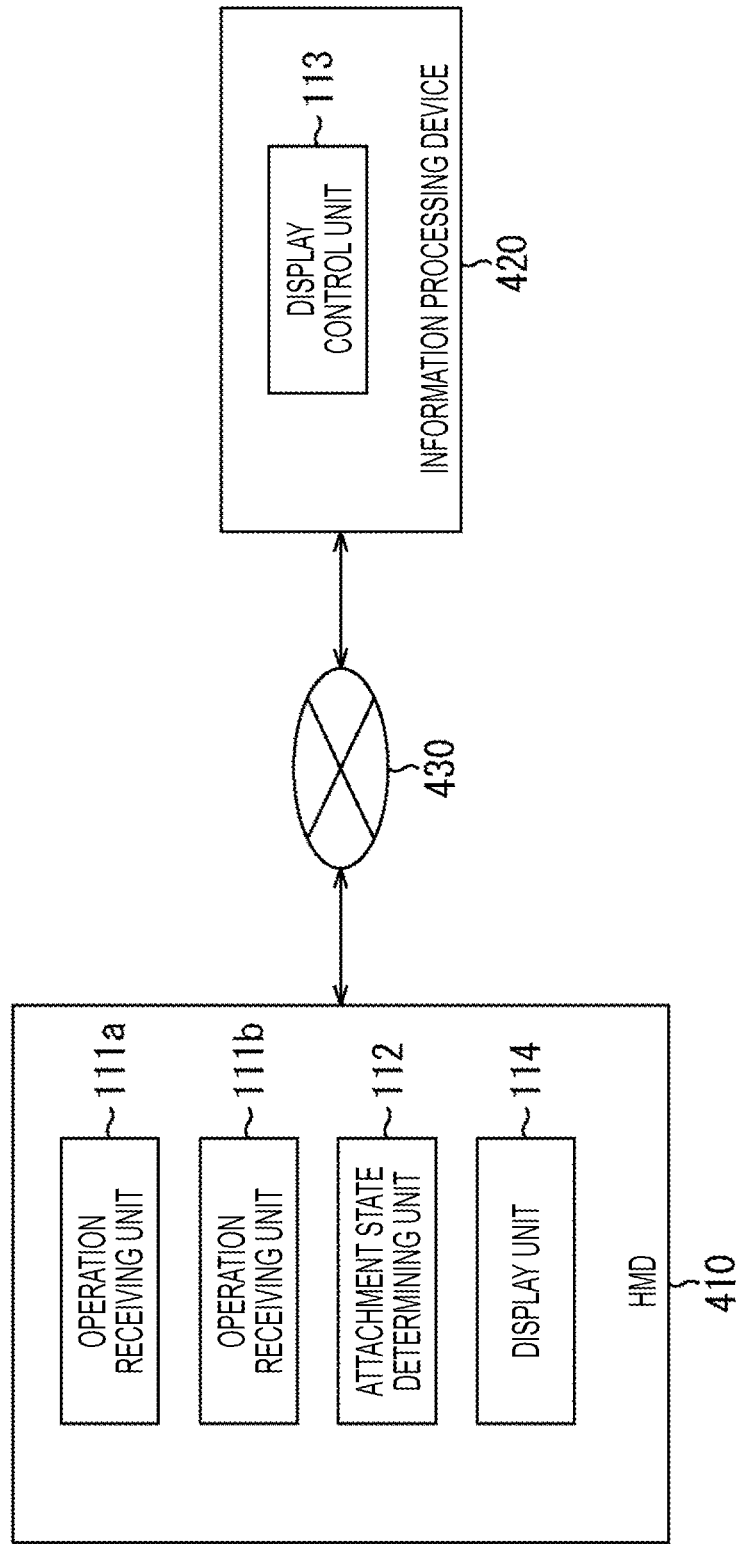
FIG. 20 is a block diagram showing still another example functional configuration of the first embodiment.

Further, as shown in FIG. 20, the HMD 410 and the information processing device 420 may be connected via a network 430 such as the Internet or an intranet. In this case, the information processing device 420 is designed as a server in the network, for example.

The above described second embodiment can also have the configurations described below.

Figure 21:
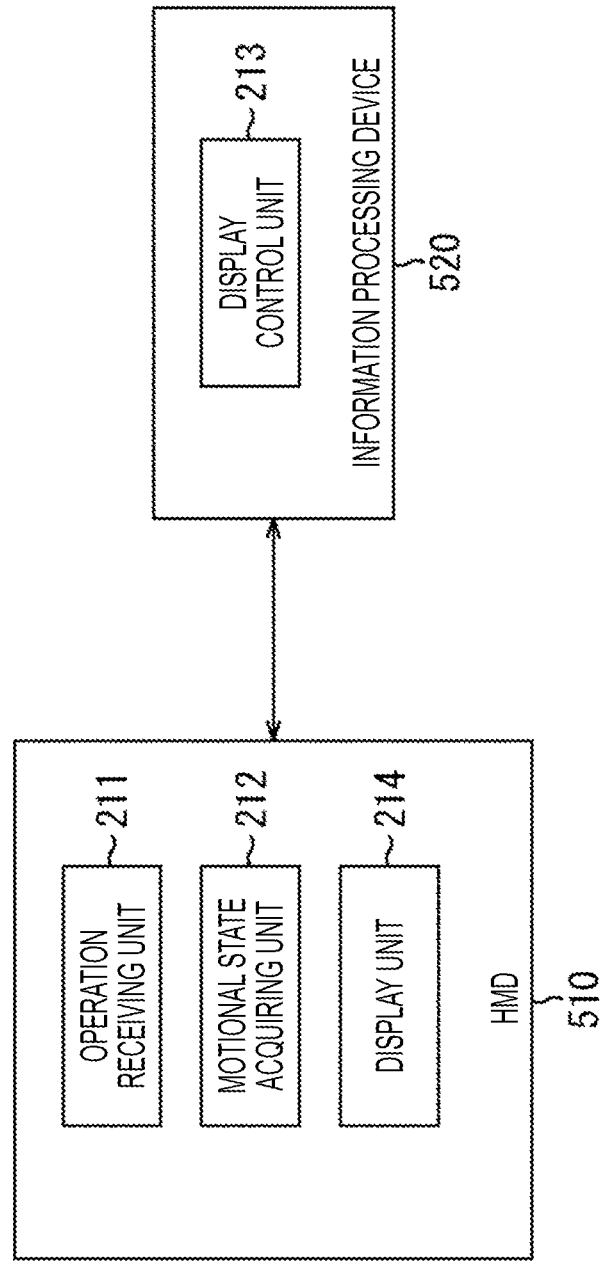
FIG. 21 is a block diagram showing another example functional configuration of the second embodiment.

As shown in FIG. 21, an HMD 510 that includes the operation receiving unit 211, the motional state acquiring unit 212, and the display unit 214, and an information processing device 520 that includes the display control unit 213 may be formed as separate structures, and perform wired communication or wireless communication using Wi-Fi (registered trademark), Bluetooth (registered trademark), or the like with each other, for example. In this case, the information processing device 520 is designed as a portable terminal such as a smartphone.

Figure 22:
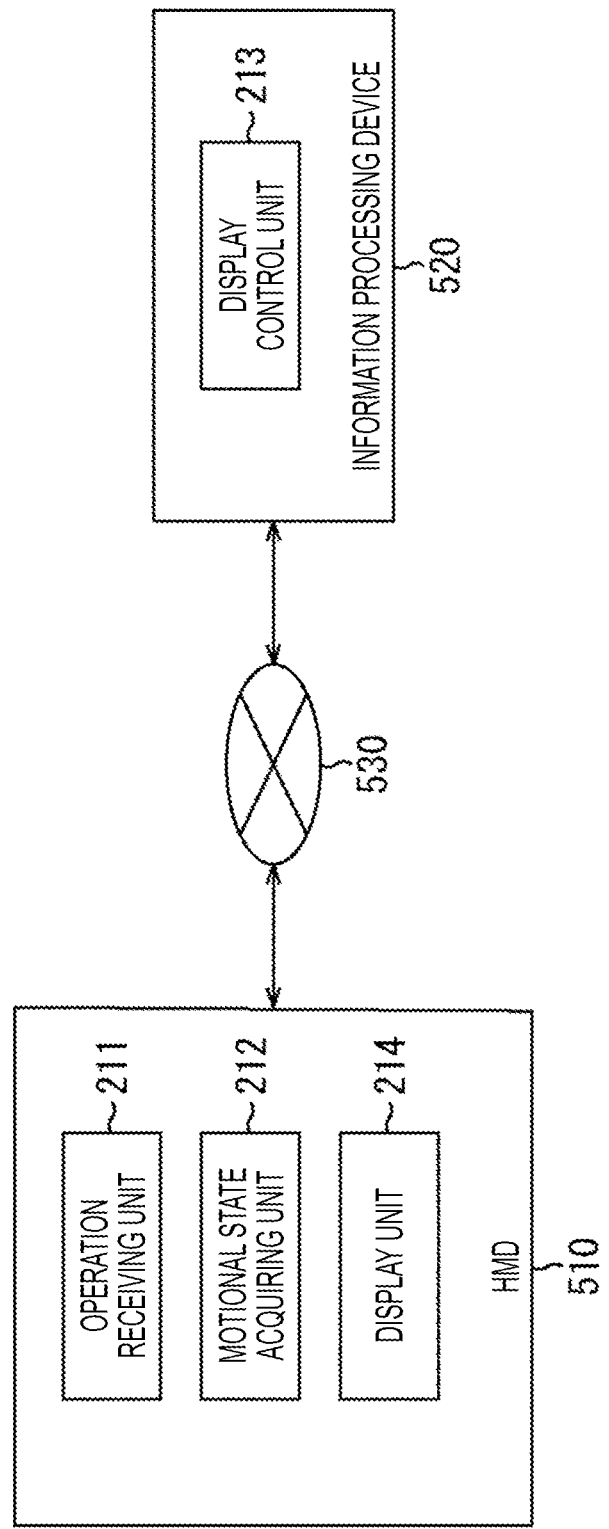
FIG. 22 is a block diagram showing still another example functional configuration of the second embodiment.

Further, as shown in FIG. 22, the HMD 510 and the information processing device 520 may be connected via a network 530 such as the Internet or an intranet. In this case, the information processing device 520 is designed as a server or the like in the network.

Although the display module 10 as an information processing device of the present technology is designed to include a touch sensor and a display unit in the above examples, the display module 10 may be designed not to include any display unit or not to include any touch sensor.

Also, in the above described examples, the display method in the display module 10 is a method using an ocular optical system in which the length in one direction is smaller than the length in the other direction of the region where the light is emitted toward the pupil of the user, and is equal to or smaller than the variation upper limit of the diameter of the pupil, or a method (a pupil division method) by which the user's pupil is divided into a portion on which light relating to an external image is incident and a portion on which light relating to an electronically generated image is incident, and optically superimposing the generated image on the external image. However, the display method in the display module 10 may be a prism method, a hologram method, or some other display method such as a so-called see-through display method or a see-around display method.

That is, the present technology can be applied to HMDs of a transmissive display type and a video see-through type.

Furthermore, the present technology may be applied to HMDs other than those of eyeglass types, such as hat-type HMDs, or to other wearable terminals such as wristwatch- or wristband-style terminals.

The above described series of processes can be performed by hardware, and can also be performed by software. Where the series of processes are to be performed by software, the program that forms the software is installed into a computer. Here, the computer may be a computer incorporated into special-purpose hardware, or may be a general-purpose personal computer, for example, that can execute various kinds of functions, having various kinds of programs installed thereinto.

Figure 23:
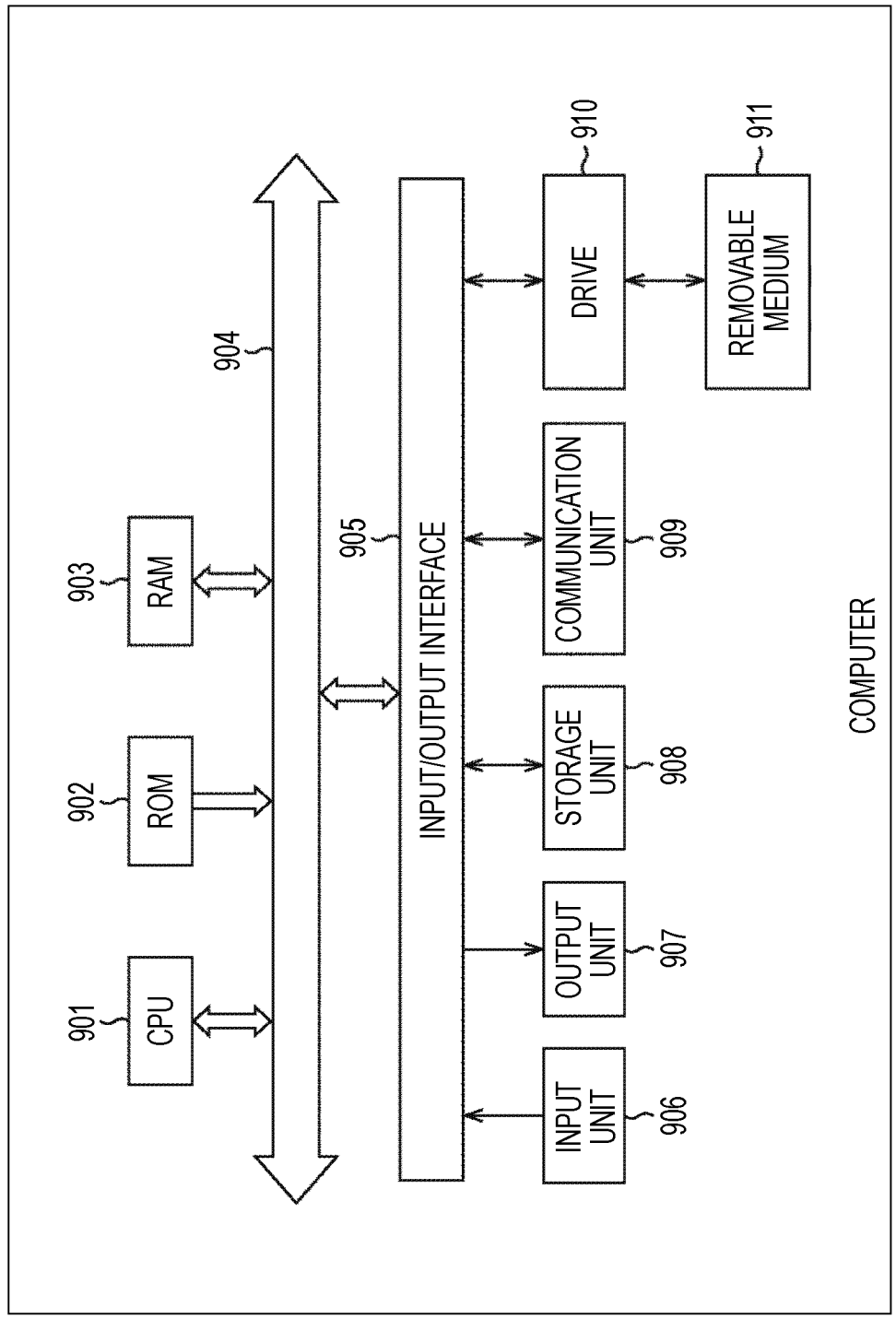
FIG. 23 is a block diagram showing an example functional configuration of a computer.

FIG. 23 is a block diagram showing an example configuration of the hardware of a computer that performs the above-described series of processes in accordance with a program.

In the computer, a CPU 901, a read only memory (ROM) 902, and a random access memory (RAM) 903 are connected to one another by a bus 904.

An input/output interface 905 is further connected to the bus 904. An input unit 906, an output unit 907, a storage unit 908, a communication unit 909, and a drive 910 are connected to the input/output interface 905.

The input unit 906 is formed with a keyboard, a mouse, a microphone, and the like. The output unit 907 is formed with a display, a speaker, and the like. The storage unit 908 is formed with a hard disk, a nonvolatile memory, or the like. The communication unit 909 is formed with a network interface or the like. The drive 910 drives a removable medium 911 such as a magnetic disk, an optical disk, a magneto-optical disk, or a semiconductor memory.

In the computer having the above described configuration, the CPU 901 loads a program stored in the storage unit 908 into the RAM 903 via the input/output interface 905 and the bus 904, for example, and executes the program, so that the above described series of processes are performed.

The program to be executed by the computer (the CPU 901) may be recorded on the removable medium 911 as a packaged medium to be provided, for example. Alternatively, the program can be provided via a wired or wireless transmission medium, such as a local area network, the Internet, or digital satellite broadcasting.

In the computer, the program can be installed into the storage unit 908 via the input/output interface 905 when the removable medium 911 is mounted on the drive 910. Alternatively, the program may be received by the communication unit 909 through a wired or wireless transmission medium, and be installed into the storage unit 908. Other than the above, the program may be installed beforehand into the ROM 902 or the storage unit 908.

It should be noted that the program to be executed by the computer may be a program for performing processes in chronological order in accordance with the sequence described in the present specification, or may be a program for performing processes in parallel or performing a process when necessary, such as when there is a call.

Further, embodiments of the present technology are not limited to the above described embodiments, and various modifications may be made to them without departing from the scope of the present technology.

The present technology may also be embodied in the configurations described below.

(1)

An information processing device including an output control unit that prevents reflection of an operation in an output in accordance with an attachment state of a housing to be attached to a head of a user, the operation being performed on an operation receiving unit provided in the housing.

(2)

The information processing device of (1), in which the output control unit invalidates an operation performed on the operation receiving unit, in accordance with the attachment state of the housing.

(3)

The information processing device of (2), in which the housing is connected to one of a pair of temple portions of a spectacle frame to be attached to the head of the user, the operation receiving unit includes operation receiving units provided on a first surface of the housing and a second surface of the housing, respectively, the second surface being located on an opposite side from the first surface, and the output control unit invalidates an operation performed on the operation receiving unit provided on an upward-facing surface of the first surface and the second surface of the housing, and causes an output to be generated in response to an operation performed on the operation receiving unit provided on a downward-facing surface, in accordance with the attachment state of the housing.

(4)

The information processing device of (3), further including a display unit provided to a lens portion of the spectacle frame or a vicinity of the lens portion of the spectacle frame, in which the output control unit controls display on the display unit, in accordance with an operation performed on the operation receiving unit.

(5)

The information processing device of (4), in which the output control unit switches a vertical orientation of an image to be displayed on the display unit, in accordance with the attachment state of the housing, the attachment state indicating to which one of the temple portions the housing is connected.

(6)

The information processing device of any of (3) to (5), further including on the housing, an imaging unit that performs imaging in a viewing direction of the spectacle frame, in which the imaging unit switches the vertical orientation of an image to be captured, in accordance with the attachment state of the housing, the attachment state indicating to which one of the temple portions the housing is connected.

(7)

The information processing device of (1), in which the output control unit reduces a gain of an output amount relative to an input amount of an operation performed on the operation receiving unit, in accordance with the attachment state of the housing.

(8)

The information processing device of (1), in which the output control unit sets stricter conditions for detection of an operation performed on the operation receiving unit, in accordance with the attachment state of the housing.

(9)

The information processing device of (1), in which the output control unit narrows a detectable range for an operation performed on the operation receiving unit, in accordance with the attachment state of the housing.

(10)

The information processing device of (1), in which the output control unit lowers detection sensitivity to an operation performed on the operation receiving unit, in accordance with the attachment state of the housing.

(11)

The information processing device of (1), in which the output control unit performs switching so that an output corresponding to an operation performed on the operation receiving unit is inverted, in accordance with the attachment state of the housing.

(12)

The information processing device of (11), in which the output control unit performs switching so that display on a display unit is inverted, in accordance with the attachment state of the housing, the display corresponding to an operation performed on the operation receiving unit.

(13)
The information processing device of any of (1) to (12), in which the operation receiving unit is formed with a touch surface of a touch sensor.

(14)
The information processing device of (13), in which the touch surface provided on a first surface of the housing and the touch surface provided on a second surface of the housing are electrically connected to one chip, the second surface being located on an opposite side from the first surface.

(15)
The information processing device of (13), in which the touch surface is designed to form a recessed portion in a surface of the housing, the touch surface being provided on the surface of the housing.

(16)
The information processing device of (13), in which the touch surface includes a different material from a surface of the housing, the touch surface being provided on the surface of the housing.

(17)
An information processing method including
a step of preventing reflection of an operation in an output in accordance with an attachment state of a housing to be attached to a head of a user, the operation being performed on an operation receiving unit provided in the housing.

(18)
A program for causing a computer to perform
a step of preventing reflection of an operation in an output in accordance with an attachment state of a housing to be attached to a head of a user, the operation being performed on an operation receiving unit provided in the housing.

REFERENCE SIGNS LIST

10 Display module
11 Control unit
12 Display unit
13 Optical unit
Spectacle frame
21 Touch sensor
21a, 21b Touch surface
111a, 111b Operation receiving unit
112 Attachment state determining unit
113 Display control unit
114 Display unit
151 Camera
171 Imaging unit
172 Recording unit
211 Operation receiving unit
212 Motional state acquiring unit
213 Display control unit
214 Display unit

The invention claimed is:

1. An information processing device comprising
an output control unit that prevents reflection of an operation in an output in accordance with an attachment state of a housing to be attached to a head of a user, the operation being performed on an operation receiving unit provided in the housing,
wherein the housing is connected to one of a pair of temple portions of a spectacle frame to be attached to the head of the user, the pair of temple portions comprising a right temple portion provided on a right side of the spectacle frame and a left temple portion provided on a left side of the spectacle frame,
wherein the operation receiving unit includes operation receiving units provided on a first surface of the housing and a second surface of the housing, respectively, the second surface being located on an opposite side from the first surface,
wherein the output control unit invalidates an operation performed on the operation receiving unit provided on an upward-facing surface of the housing corresponding to the second surface of the housing, and causes an output to be generated in response to an operation performed on the operation receiving unit provided on a downward-facing surface of the housing corresponding to the first surface of the housing, in accordance with the attachment state of the housing,
wherein the attachment state of the housing is whether the housing is connected to the right temple portion or the left temple portion of the spectacle frame,
wherein the information processing device further comprises a display unit provided to a lens portion of the spectacle frame or in a position permitting to display a predetermined screen on the lens portion of the spectacle frame,
wherein the output control unit controls display on the display unit, in accordance with an operation performed on the operation receiving unit,
wherein the output control unit switches a vertical orientation of an image to be displayed on the display unit, in accordance with the attachment state of the housing, the attachment state indicating to which one of the temple portions the housing is connected, and
wherein the output control unit and the operation receiving unit are each implemented via at least one processor.

2. The information processing device according to claim 1, further comprising
on the housing, an imaging unit that performs imaging in a viewing direction of the spectacle frame,
wherein the imaging unit also switches the vertical orientation of an image to be captured, in accordance with the attachment state of the housing, the attachment state indicating to which one of the temple portions the housing is connected.

3. The information processing device according to claim 1, wherein the output control unit reduces an output amount relative to an operation input amount of the operation performed on the operation receiving unit, in accordance with the attachment state of the housing.

4. The information processing device according to claim 1, wherein the output control unit increases a value of electrostatic capacitance serving as a reference for detection of an operation performed on the operation receiving unit, in accordance with the attachment state of the housing.

5. The information processing device according to claim 1, wherein the output control unit narrows a detectable range for an operation performed on the operation receiving unit, in accordance with the attachment state of the housing.

6. The information processing device according to claim 1, wherein the output control unit lowers detection sensitivity to an operation performed on the operation receiving unit, in accordance with the attachment state of the housing.

7. The information processing device according to claim 1, wherein the output control unit performs a first switching so that an output corresponding to an operation performed on the operation receiving unit is inverted, in accordance with the attachment state of the housing.

8. The information processing device according to claim 7, wherein the output control unit performs a second switching so that display on a display unit is inverted, in accordance with the attachment state of the housing, the display corresponding to an operation performed on the operation receiving unit.

9. The information processing device according to claim 1, wherein at least one of the first surface of the housing or the second surface of the housing is a touch surface of a touch sensor.

10. The information processing device according to claim 9, wherein a first touch surface provided on the first surface of the housing and a second touch surface provided on the second surface of the housing are electrically connected to one chip.

11. The information processing device according to claim 9, wherein the touch surface is designed to form a recessed portion in a surface of the housing, the touch surface being provided on the surface of the housing.

12. The information processing device according to claim 9, wherein the touch surface includes a different material from a surface of the housing, the touch surface being provided on the surface of the housing.

13. An information processing method comprising:
   preventing reflection of an operation in an output in accordance with an attachment state of a housing to be attached to a head of a user, the operation being performed on an operation receiving unit provided in the housing,
      wherein the housing is connected to one of a pair of temple portions of a spectacle frame to be attached to the head of the user, the pair of temple portions comprising a right temple portion provided on a right side of the spectacle frame and a left temple portion provided on a left side of the spectacle frame, and
      wherein the operation receiving unit includes operation receiving units provided on a first surface of the housing and a second surface of the housing, respectively, the second surface being located on an opposite side from the first surface;
   invalidating an operation performed on the operation receiving unit provided on an upward-facing surface of the housing corresponding to the second surface of the housing;
   causing an output to be generated in response to an operation performed on the operation receiving unit provided on a downward-facing surface of the housing corresponding to the first surface of the housing, in accordance with the attachment state of the housing,
      wherein the attachment state of the housing is whether the housing is connected to the right temple portion or the left temple portion of the spectacle frame;
   displaying a predetermined screen on a lens portion of the spectacle frame;
   controlling display on the lens portion of the spectacle frame in accordance with an operation performed on the operation receiving unit; and
   switching a vertical orientation of an image to be displayed on the lens portion of the spectacle frame, in accordance with the attachment state of the housing.

14. A non-transitory computer-readable medium having embodied thereon a program, which when executed by a computer causes the computer to perform a method, the method comprising:
   preventing reflection of an operation in an output in accordance with an attachment state of a housing to be attached to a head of a user, the operation being performed on an operation receiving unit provided in the housing,
      wherein the housing is connected to one of a pair of temple portions of a spectacle frame to be attached to the head of the user, the pair of temple portions comprising a right temple portion provided on a right side of the spectacle frame and a left temple portion provided on a left side of the spectacle frame, and
      wherein the operation receiving unit includes operation receiving units provided on a first surface of the housing and a second surface of the housing, respectively, the second surface being located on an opposite side from the first surface;
   invalidating an operation performed on the operation receiving unit provided on an upward-facing surface of the housing corresponding to the second surface of the housing;
   causing an output to be generated in response to an operation performed on the operation receiving unit provided on a downward-facing surface of the housing corresponding to the first surface of the housing, in accordance with the attachment state of the housing,
      wherein the attachment state of the housing is whether the housing is connected to the right temple portion or the left temple portion of the spectacle frame;
   displaying a predetermined screen on a lens portion of the spectacle frame;
   controlling display on the lens portion of the spectacle frame in accordance with an operation performed on the operation receiving unit; and
   switching a vertical orientation of an image to be displayed on the lens portion of the spectacle frame, in accordance with the attachment state of the housing.

* * * * *